(12) United States Patent
Prete et al.

(10) Patent No.: US 7,936,201 B2
(45) Date of Patent: May 3, 2011

(54) APPARATUS AND METHOD FOR PROVIDING A SIGNAL FOR TRANSMISSION VIA A SIGNAL LINE

(75) Inventors: Edoardo Prete, Dresden (DE);
Hans-Peter Trost, Munich (DE);
Anthony Sanders, Haar (DE); Dirk Scheideler, Munich (DE); Georg Braun, Holzkirchen (DE); Steve Wood, Munich (DE); Richard Johannes Luyken, Munich (DE)

(73) Assignee: Qimonda AG, Munich (DE)

( * ) Notice: Subject to any disclaimer, the term of this patent is extended or adjusted under 35 U.S.C. 154(b) by 1166 days.

(21) Appl. No.: 11/644,998

(22) Filed: Dec. 22, 2006

(65) Prior Publication Data

US 2008/0155150 A1    Jun. 26, 2008

(51) Int. Cl.
*G06F 5/06*    (2006.01)
(52) U.S. Cl. .............. 327/309; 711/104; 365/233.15
(58) Field of Classification Search .............. 703/14; 327/319, 309; 711/104; 365/189.05, 233, 365/189.09, 230.05, 205, 194; 714/700
See application file for complete search history.

(56) References Cited

U.S. PATENT DOCUMENTS

| | | | | |
|---|---|---|---|---|
| 5,197,035 A | * | 3/1993 | Ito | 365/230.05 |
| 5,404,338 A | * | 4/1995 | Murai et al. | 365/189.05 |
| 5,659,513 A | * | 8/1997 | Hirose et al. | 365/205 |
| 5,831,467 A | * | 11/1998 | Leung et al. | 327/319 |
| 6,304,494 B1 | * | 10/2001 | Arimoto | 365/189.09 |
| 6,473,828 B1 | * | 10/2002 | Matsui | 711/104 |
| 6,665,222 B2 | * | 12/2003 | Wright et al. | 365/194 |
| 2002/0136081 A1 | * | 9/2002 | Maesako et al. | 365/233 |
| 2002/0145927 A1 | * | 10/2002 | Kojima et al. | 365/205 |
| 2004/0068682 A1 | * | 4/2004 | Takei et al. | 714/700 |

OTHER PUBLICATIONS

Boberg, R., "Proposed microcomputer system 796 bus standard", IEEE 1980.*
Nasr, R. M., "FBSIM and the Fully Buffered DIMM Memory System Architecture," http://www.eng.umd.edu/~blj/papers/thesis-MS-nasr-FBDIMM, 2005. pp. 1-138.

* cited by examiner

*Primary Examiner* — Kandasamy Thangavelu
(74) *Attorney, Agent, or Firm* — John S. Economou

(57) ABSTRACT

An apparatus for providing a signal for transmission via a signal line includes a controller circuit having an output for a signal indicating whether the signal line is or will be in an inactive state and a switching circuit coupled to the controller circuit and having an output coupled to the signal line. The output is switched between different signal levels, if the signal indicates that the signal line is in an inactive state.

28 Claims, 12 Drawing Sheets

| Function | CKE Previous Cycle | CKE Current Cycle | $\overline{CS}$ | $\overline{RAS}$ | $\overline{CAS}$ | $\overline{WE}$ | BA0 - BAx[9] | Axx[9] - A11 | A10 | A9-A0 | Notes |
|---|---|---|---|---|---|---|---|---|---|---|---|
| (Extended) Mode Register Set | H | H | L | L | L | L | BA | OP Code | | | 1,2 |
| Refresh (REF) | H | H | L | L | L | H | X | X | X | X | 1 |
| Self Refresh Entry | H | L | L | L | L | H | X | X | X | X | 1,8 |
| Self Refresh Exit | L | H | H | X | X | X | X | X | X | X | 1,7,8 |
| | | | L | H | H | H | | | | | |
| Single Bank Precharge | H | H | L | L | H | L | BA | X | L | X | 1,2 |
| Precharge all Banks | H | H | L | L | H | L | X | X | H | X | 1 |
| Bank Activate | H | H | L | L | H | H | BA | Row Address | | | 1,2 |
| Write | H | H | L | H | L | L | BA | Column | L | Column | 1,2,3 |
| Write with Auto Precharge | H | H | L | H | L | L | BA | Column | H | Column | 1,2,3 |
| Read | H | H | L | H | L | H | BA | Column | L | Column | 1,2,3 |
| Read with Auto-Precharge | H | H | L | H | L | H | BA | Column | H | Column | 1,2,3 |
| No Operation | H | X | L | H | H | H | X | X | X | X | 1 |
| Device Deselect | H | X | H | X | X | X | X | X | X | X | 1 |
| Power Down Entry | H | L | H | X | X | X | X | X | X | X | 1,4 |
| | | | L | H | H | H | | | | | |
| Power Down Exit | L | H | H | X | X | X | X | X | X | X | 1,4 |
| | | | L | H | H | H | | | | | |

FIG.2

```
26  // State counter block and control of insertion signals
27  always @ (posedge ck) begin
28    // First, count state delta
29    if (din === 1'b1)
30      ctr_1m0 <= `CTRDLYHALF ctr_1m0 + 1;
31    else if (din === 1'b0)
32      ctr_1m0 <= `CTRDLYHALF ctr_1m0 - 1;
33    else
34      ctr_1m0 <= `CTRDLYHALF ctr_1m0;
35
36    //Then, wait for counter update and decide for insertion signals
37    `CTRDLYHALF;
38    if (ctr_1m0 === 'b0) begin
39      // If the delta is 0, we should not insert anything
40      ins_0 <= `CTRDLYHALF 1'b0;
41      ins_1 <= `CTRDLYHALF 1'b0;
42    end
43    else if (ctr_1m0[ctr_bits-1] === 1'b0) begin
44      // It's a positive number. That means there have been more 1's than 0's.
45      // Therefore 0's should be inserted if we are above the absolute threshold.
46      if (ctr_1m0 >= limit_ins_0) begin
47        ins_0 <= `CTRDLYHALF 1'b1;
48        ins_1 <= `CTRDLYHALF 1'b0; // if we want to insert 0's, we should not also insert 1's
49      end
50      else begin
51        ins_0 <= `CTRDLYHALF 1'b0;
52      end
53    end
54    else if (ctr_1m0[ctr_bits-1] === 1'b1) begin
55      // It's a negative number. That means there have been less 1's than 0's.
56      // Therefore 1's should be inserted if we are above the absolute threshold.
57      if (-ctr_1m0 >= limit_ins_1) begin
58        ins_1 <= `CTRDLYHALF 1'b1;
59        ins_0 <= `CTRDLYHALF 1'b0; // if we want to insert 1's, we should not also insert 0's.
60      end
61      else begin
62        ins_1 <= `CTRDLYHALF 1'b0;
63      end
64    end
65  end
```

FIG.5

```
// check if and what should be inserted
always @ (posedge ck) begin
  if (equ === 1'b1) begin
    //wait until other inputs are stable:
    `CTRDLY;
    if (ins_0 === 1'b1 && ins_1 === 1'b0) begin
      dout <= `INSERTERDLY 1'b0;
    end
    else if (ins_1 === 1'b1 && ins_0 === 1'b0) begin
      dout <= `INSERTERDLY 1'b1;
    end
    else begin
      dout <= `INSERTERDLY din;
    end
  end
  else begin
    `CTRDLY;
    dout <= `INSERTERDLY din;
  end
end
```

```
 67  // Then, calculate the abs_dev's for cs, ras, cas and we:
 68  if (ctr_1m0_cs === 'b0) abs_dev_cs = 'b0;
 69  else if (ctr_1m0_cs[ctr_bits-1] === 1'b0) begin
 70    // it's a positive number: more 1's than 0's
 71    if (ctr_1m0_cs > limit_ins_cs_0) abs_dev_cs = ctr_1m0_cs - limit_ins_cs_0;
 72    else                             abs_dev_cs = 'b0;
 73  end
 74  else if (ctr_1m0_cs[ctr_bits-1] === 1'b1) begin
 75    // it's a negative number: more 0's than 1's
 76    if (-ctr_1m0_cs > limit_ins_cs_1) abs_dev_cs = -ctr_1m0_cs - limit_ins_cs_1;
 77    else                              abs_dev_cs = 'b0;
 78  end
 79
 80  if (ctr_1m0_ras === 'b0) abs_dev_ras = 'b0;
 81  else if (ctr_1m0_ras[ctr_bits-1] === 1'b0) begin
 82    // it's a positive number: more 1's than 0's
 83    if (ctr_1m0_ras > limit_ins_ras_0) abs_dev_ras = ctr_1m0_ras - limit_ins_ras_0;
 84    else                               abs_dev_ras = 'b0;
 85  end
 86  else if (ctr_1m0_ras[ctr_bits-1] === 1'b1) begin
 87    // it's a negative number: more 0's than 1's
 88    if (-ctr_1m0_ras > limit_ins_ras_1) abs_dev_ras = -ctr_1m0_ras - limit_ins_ras_1;
 89    else                                abs_dev_ras = 'b0;
 90  end
 91
 92  if (ctr_1m0_cas === 'b0) abs_dev_cas = 'b0;
 93  else if (ctr_1m0_cas[ctr_bits-1] === 1'b0) begin
 94    // it's a positive number: more 1's than 0's
 95    if (ctr_1m0_cas > limit_ins_cas_0) abs_dev_cas = ctr_1m0_cas - limit_ins_cas_0;
 96    else                               abs_dev_cas = 'b0;
 97  end
 98  else if (ctr_1m0_cas[ctr_bits-1] === 1'b1) begin
 99    // it's a negative number: more 0's than 1's
100    if (-ctr_1m0_cas > limit_ins_cas_1) abs_dev_cas = -ctr_1m0_cas - limit_ins_cas_1;
101    else                                abs_dev_cas = 'b0;
102  end
103
104  if (ctr_1m0_we === 'b0) abs_dev_we = 'b0;
105  else if (ctr_1m0_we[ctr_bits-1] === 1'b0) begin
106    // it's a positive number: more 1's than 0's
107    if (ctr_1m0_we > limit_ins_we_0) abs_dev_we = ctr_1m0_we - limit_ins_we_0;
108    else                             abs_dev_we = 'b0;
109  end
110  else if (ctr_1m0_we[ctr_bits-1] === 1'b1) begin
111    // it's a negative number: more 0's than 1's
112    if (-ctr_1m0_we > limit_ins_we_1) abs_dev_we = -ctr_1m0_we - limit_ins_we_1;
113    else                              abs_dev_we = 'b0;
114  end
115
116  // Wait and decide for insertion signals
117  `CMDCTRDLYHALF;
118
```

FIG.9

```
119  // Find out if there is a need for insertion at all:
120  if (   abs_dev_cs  > 0 || abs_dev_ras > 0
121       || abs_dev_cs  > 0 || abs_dev_we  > 0) begin
122      // Okay. Insertion is needed. Which one?
123      // Find out if CS needs to insert a 0 and the hightest urgency:
124      if (  abc_dev_cs  > 0  // CS is above the absolute limits and needs some insertion
125           && ctr_1m0_cs [ctr_bits-1]  === 1'b0 // it's a positive number: counted more 1's than 0's
126           && abs_dev_cs > abs_dev_ras    // CS has higher prio than RAS
127           && abs_dev_cs > abs_dev_cas    // CS has higher prio than CAS
128           && abs_dev_cs > abs_dev_we  ) begin  //  CS has higher prio than WE
129          // A NOP needs to be inserted
130          ( ins_cs_0, ins_ras_1, ins_cas_1, ins_we_1) <= 'CMDCTRDLYHALF 4'b1;
131          ( ins_cs_1, ins_ras_0, ins_cas_0, ins_we_0) <= 'CMDCTRDLYHALF 4'b0;
132      end
133      else begin
134          // A DES is the better one, i.e. CS high and the others free for individual insertion
135          ( ins_cs_0, ins_cs_1) <= 'CMDCTRDLYHALF 2'b01;
136
137          // Decite what to insert for RAS
138          if (  abc_dev_ras  > 0) begin
139              if (ctr_1m0_ras[ctr_bits-1] === 1'b1) // delta is negative, therefore, insert a 1
140                  ( ins_ras_0, ins_ras_1) <= 'CMDCTRDLYHALF 2'b01;
141              else // delta is positive, therefore, insert a 0
142                  ( ins_ras_0, ins_ras_1) <= 'CMDCTRDLYHALF 2'b10;
143          end else begin
144              ( ins_ras_0, ins_ras_1) <= 'CMDCTRDLYHALF 2'b0;
145          end
146
147          // Decite what to insert for CAS
148          if (  abc_dev_cas  > 0) begin
149              if (ctr_1m0_cas[ctr_bits-1] === 1'b1) // delta is negative, therefore, insert a 1
150                  ( ins_cas_0, ins_cas_1) <= 'CMDCTRDLYHALF 2'b01;
151              else // delta is positive, therefore, insert a 0
152                  ( ins_cas_0, ins_cas_1) <= 'CMDCTRDLYHALF 2'b10;
153          end else begin
154              ( ins_cas_0, ins_cas_1) <= 'CMDCTRDLYHALF 2'b0;
155          end
156
157          // Decite what to insert for WE
158          if (  abc_dev_we  > 0) begin
159              if (ctr_1m0_we[ctr_bits-1] === 1'b1) // delta is negative, therefore, insert a 1
160                  ( ins_we_0, ins_we_1) <= 'CMDCTRDLYHALF 2'b01;
161              else // delta is positive, therefore, insert a 0
162                  (ins_we_0, ins_we_1) <= 'CMDCTRDLYHALF 2'b10;
163          end else begin
164              ( ins_we_0, ins_we_1) <= 'CMDCTRDLYHALF 2'b0;
165          end
166      end
167  end
168  else begin
169      // No need at all for any insertion
170      ( ins_cs_0, ins_cs_1, ins_ras_0, ins_ras_1, ins_cas_0, ins_cas_1,ins_we_0, ins_we_1) <= 'CMDCTRDLYHALF 'b0;
171  end
```

APPARATUS AND METHOD FOR PROVIDING A SIGNAL FOR TRANSMISSION VIA A SIGNAL LINE

TECHNICAL FIELD

The present invention relates to an apparatus and a method for providing a signal for transmission via a signal line, for instance to a transmitter for a low power fly-by bus with an RC termination.

BACKGROUND

High-speed fly-by bus structures require, especially in the field of memory systems, a signal termination at the end of the bus to avoid reflections. This termination increases both, the AC (AC=alternating current) and the DC (DC=direct current), power dissipation at both ends of the bus structure, at the transmitter as well as at the terminator.

To reduce the DC power dissipation an RC termination, also referred to as a so-called AC coupled termination, can be used. This approach is, for example, used in high speed networking applications, in which a capacitor (C) is used in series with a termination resistor (R). As a consequence, the AC portion of the signal transmitted over the corresponding signal line is still terminated more or less with an impedance value of the termination resistor. However, the DC portion of the signal basically experiences an infinite impedance so that in a good approximation, no DC power is dissipated.

The series capacitor introduces additional disturbances to the signal line, for instance in the form of additional inter-symbol-interference (ISI), which is usually addressed by equalization methods on the transmitter side of the signal line of the bus in the form of an equalized driver. To be more precise, usually equalizers are added to the transmitters to compensate the additional ISI on the channel introduced by the RC termination. However, depending on the implementation, the circuits needed for equalization at the transmitter consume a considerable amount of die size.

Moreover, during long periods of inactivity, the bus may drift away making it impossible to instantaneously use the bus when needed. This is mainly caused by the capacitor introduced to the signal line of the bus in the framework of the RC termination, as a finite voltage can be generated across the capacitor caused by leakage currents and finite voltages applied to the signal lines, leading to a finite charge and hence a finite voltage at the capacitor.

SUMMARY OF THE INVENTION

According to an embodiment of the present invention, an apparatus for providing a signal for transmission via a signal line comprises a controller circuit comprising an output for a signal indicating whether the signal line is in an inactive state and a switching circuit coupled to the controller circuit and having an output coupled to the signal line, wherein the output is switched between different signal levels, if the signal indicates that the signal line is in an inactive state.

According to a further embodiment of the present invention, an apparatus for providing a signal for transmission via a signal line of a data bus or a command/address bus of a memory system comprises a controller circuit for determining whether the signal line is in an inactive state by recognizing a Single Bank Precharge, a Precharge all Banks state, a No Operations state or a Device Deselect state based on the signal states of at least one of the command line and the address lines of the command/address bus, and a switching circuit for switching the signal on the signal line between different signal levels, if the controller circuit for determining an inactive state determines that the signal line is in an inactive state.

BRIEF DESCRIPTION OF THE DRAWINGS

Embodiments of the present invention are described hereinafter, making reference to the appended drawings.

FIG. 2 shows a list of commands of a DDR2 SDRAM;

FIG. 5 shows a behavioral description of a state counter block of the embodiment shown in FIG. 3.

FIG. 9 shows a second part of the behavioral description of the command state counter block of the embodiment shown in FIG. 3;

FIG. 10 shows a third part of the behavioral description of the command state counter block of the embodiment shown in FIG. 3;

DETAILED DESCRIPTION OF ILLUSTRATIVE EMBODIMENTS

FIGS. 1 to 12 show block diagrams, a table of commands of a DDR2 SDRAM, behavioral descriptions, and timing diagrams for signals of embodiments of an apparatus for providing a signal for transmission via a signal line according to the present invention. Before a second embodiment of the present invention is described with respect to FIGS. 2 to 12, a first embodiment of an apparatus for providing a signal for transmission via a signal line is explained with respect to the block diagram shown in FIG. 1.

Figure 1:
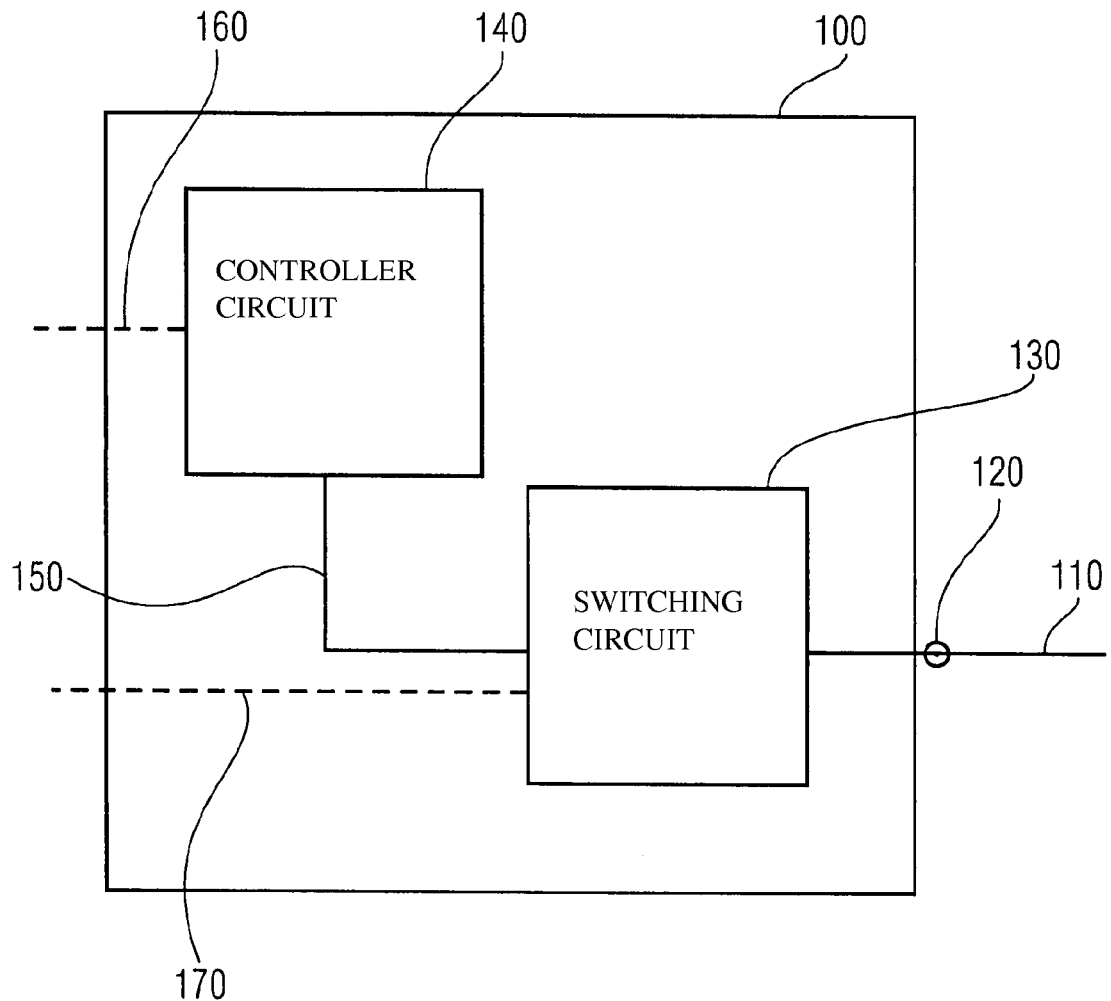
FIG. 1 shows a block diagram of a first embodiment of an apparatus for providing a signal for transmission via a signal line.

FIG. 1 shows a first embodiment of an inventive apparatus 100 for providing a signal for transmission via a signal line 110. The signal line 110 is connected via an output 120 of the apparatus 100 to a switching circuit 130. The switching circuit 130 is connected to a controller circuit 140 via an internal signal line 150 and an output of the controller circuit 140.

As an optional component, the controller circuit 140 is in the first embodiment shown in FIG. 1 connected to a bus or a signal line 160, which provides the controller circuit 140 with information to enable the controller circuit 140 to determine if the signal line 110 is or will be in an active or an inactive state. For instance, the bus 160 can be a command/address bus or a command/address/control bus of a memory system indicating if the signal line 110 is or will be in an active or an inactive state as will be more closely outlined in the context of FIG. 2.

However, the bus or the signal line 160 can in principle be any signal line carrying states or symbols on the basis of which the controller circuit 140 is capable of distinguishing if the signal line 110 is or will be in an active or inactive state. As an example, the bus or signal line 160 can also be a signal line provided to the controller circuit 140 from an external component, which carries a signal enabling the controller circuit to decide the state the signal line 110 is or will be in.

Based on the information provided via the bus or the signal line 160, the controller circuit outputs a signal or a switch signal (switching signal) via its output and the internal signal line 150 indicating whether the signal line 110 is or will be in an inactive or an active state. Based on the signal or the switch signal, the switching circuit 130 switches the signal line 110 between different signal levels if the signal provided via the internal signal line 150 indicates that the signal line 110 is or will be in an inactive state.

However, if the switch signal provided via the internal signal line 150 indicates that the signal line 110 is or will be in an active state, the signal levels provided to the signal line 110 are closely related to the signals to be sent over the signal line 110.

In the embodiment shown in FIG. 1, the switching circuit 130 is furthermore connected to an incoming signal line 170, which provides the switching circuit 130 with the signal to be transmitted via the signal line 110 in an active state. In other words, in the embodiment shown in FIG. 1, the switching circuit 130 is not only capable of switching the signal line between different signal levels, if the signal provided by the controller circuit 140 indicates that the signal line is or will be in an active state, but is also capable of transmitting a signal provided by the incoming signal line to the switching circuit 130 to the signal line in the case of an active state of the signal line 110.

However, as the incoming signal line 170 is only an option in an embodiment of an apparatus 100, the signal to be provided to the signal line 110 can also be coupled to the signal line 110 via an additional switch connecting the signal line providing the signal to be transported by the signal line 110 to the signal line 110 in the case that the controller circuit 140 determines that the signal line 110 is or will be in an active state, and connecting the signal line 110 to the switching circuit 130 otherwise.

Whenever the controller circuit 140 of the apparatus 100 determines, based on the signal provided to the controller circuit 140 by the bus or signal line 160, that the signal line 110 is or will be in an inactive state, the controller circuit 140 provides at its output a signal, or a switch signal to the internal signal line 150 connecting the controller circuit 140 and the switching circuit 130. The switching circuit 130 then switches between different signal levels, if the signal received from the controller circuit 140 indicates that the signal line 110 is or will be in an inactive state. In some embodiments, the switching between the different signal levels is such that the time during which the signal line 110 is at a specific signal level is adapted to a ratio of the times during which the signal lines is at the respective signal levels.

In the case of a digital or binary signal transmitted over the signal line 110, a single ratio indicating a desired ratio of the times that the signal line 110 is intended to spend at a first signal level and the time the signal line 110 is intended to spend at a second signal level.

The ratio can in principle be any (non-negative or positive) real-valued number in the range between zero and infinity. If, as an example, the signal line 110 is supposed to spend one quarter of the time at the first signal level (e.g. 0) compared to three quarters at the second signal level (e.g. 1), the ratio is $$t(1):t(0)=3:1=3 \tag{1}$$

If, for example, the signal line 110 is supposed to spend twice the time at the first signal level (e.g. 0) compared to the time it spends at the second signal level (e.g. 1), the ratio is $$t(1):t(0)=1:2=0.5 \tag{2}$$

If, as a final example, the time that the signal line 110 spends at the first signal level, and the second signal level are equal, the ratio is $$t(1):t(0)=1:1=1 \tag{3}$$

In this context, it is important to note that the ratio can be fixed having a specific value implemented in an embodiment of an apparatus 100 in the form of a hardwired circuitry, a fixed programming (e.g. stored in a read-only memory or a ROM) or another non-changeable programming of implementation. However in other embodiments of an apparatus 100, the ratio is adaptable during the operation of the apparatus 100, so that the value of the ratio can be adapted on-the-fly. This can, for instance, be achieved in the form of changeable programming or an implementation of the circuitry comprising a memory for storing the value of the ratio. As a further example, the value of the ratio can also be implemented to be programmable in the sense of being changeable via program code or instructions received from a processor, CPU (central processing unit), GPU (graphics processing unit) or other integrated circuitries. Implementing adaptable or programmable ratios offers, for instance, the possibility of implementing a hysteresis or hysteretic behavior, which is beneficial in some implementations.

To be more precise, whenever a certain event is reached, e.g., an insertion limit is reached, overshot or undershot, a reevaluation of the appropriate limit, of a set of limits or of all limits, can be triggered leading to an adoption of the values according to the requirements of the implementation of the embodiment and/or the current operating situation. Depending on the actual modification of the appropriate limits, a hysteretic behavior with respect to the average signal level on one, a set of or all signal lines can be implemented. As a consequence, the build up of charge on the capacitance of the signal lines and/or its termination can be positively influenced or even be better suppressed. However, by modifying the appropriate limits an oscillation of the average of the signal levels can be implemented.

In the case of the signal line 110 transporting a multi-level signal as a discreet signal having more than two signal levels, it might be advisable to implement more than one ratio indicating relations of times the signal line 110 is supposed to spend at respective signal levels. However, in the case of a multi-level signal line 110, it might also be advisable to over determine the relations, for instance, by implementing the desired ratios in the form of a matrix indicating the desired ratios of each signal level value with respect to each other signal level value admissible on the signal line 110. Introducing a matrix can be advisable as it might offer the possibility to increase the computational efficiency of the switching circuit 130, or an appropriate circuitry or component as a verification as to how well the actual times of two different signal levels correspond to the appropriate ratio do not necessarily involve combining more than one ratio to obtain the desired value.

However, on the case of a multi-level signal line 110, the different ratios or the matrix comprising the ratios can be implemented as a fixed set of ratios or a fixed matrix, an adaptable set of ratios or as an adaptable matrix, or as a programmable set of ratios, or as a programmable matrix. In the case of an adaptable or programmable set of ratios or an adaptable matrix, it might be advisable to implement a cross check to verify the ratios of the set of ratios, or the ratios in the matrix are not contradictory to each other. This might especially be important in the field of implementing the ratios in the form of a matrix, as the matrix represents an over-determined set of ratios.

Furthermore, it is important to note that the signal line 110 can be a single ended signal line or a differential signal line, as for instance used in the context of LVDS (low voltage differential signaling). Furthermore, the signal line can be used for transporting both full, swing signals and signals having a reduced signal amplitude, compared to their absolute values. Moreover, the signals transmitted over the signal line 110 can be mainly characterized by voltage levels applied to the signal line 110 or currents flowing through the signal line 110.

In embodiments of the present invention, the time the signal line 110 spends at a respective signal level can be determined by the switching circuit 130 by employing a counter, a clock, or a timer for determining the time during which the signal line 110 is on the respective signal level. In the context, it is important to note that the counter, clock, or timer can, for instance, depend on an internal clock signal, an external clock signal, or another signal indicating a short interval of time on which the counter, the clock, or the timer is based upon, has elapsed. As a consequence, the counter, the clock, or timer can be based on a clock signal of a bus structure, for instance, in the field of memory systems.

The apparatus 100 can, for instance, be part of a transmitter of a component like an AMB (advanced memory buffer) of a FB-DIMM, an AMB2 or registers for RDIMMs or other transmitters for low power fly-by-buses with an RC termination, for instance, in the field of FBDIMM projects.

As outlined in the introductory parts of the present patent application, high-speed fly-by-bus structures often require a signal termination at the end of the bus in order to avoid reflections, although this termination increases both, the AC and DC dissipation on both ends of the bus. To reduce the DC power dissipation, a so-called RC termination, which is also referred to as AC coupled termination or AC couples, is employed. An RC termination comprises a series of a capacitor (C) and a termination resistor (R), which leads to the AC portion of the signal being terminated more or less with the impedance of the termination resistor, whereas the DC portion of the signal experiences basically infinite impedances. However, apart from the additional ISI introduced by the series capacitor, which is usually addressed by equalizers on the transmitter sides in the form of equalized drivers, the use of capacitors very often results during long periods of inactivity, in which the bus is at least in a temporary inactive state, in the bus drifting away, as the capacitor builds up a charge and hence a finite voltage. As a consequence of this charge and the associated voltage, it is more or less impossible to instantaneously use the bus when needed.

Hence, as an advantage of the embodiments of the present invention, a drift of a signal line 110 comprising a RC termination can be prevented by determining whether the signal line is or will be in an inactive or a temporary inactive state, and by switching the signal line 110 between different signal levels, if the signal line 110 is in an inactive state. Thereby, it is possible to prevent charge from being accumulated at the capacitor of the termination leading to a finite voltage across the capacitor preventing the signal line from being instantaneously usable again, if the signal line switches back to an active state.

An embodiment of the present invention hence offers the possibility of reducing the time that the signal line 110 requires to reach a state in which signals can be transferred again. Furthermore, as a build up of charge on the capacitor of the RC termination is significantly reduced or even prevented, the danger of disturbed signals leading to data, commands, addresses or other information being erroneous, is significantly reduced.

In other words, an embodiment of the present invention is based on the finding that the time a signal line 110 needs before it can transmit signals after being in an inactive state can be significantly reduced by introducing a switching circuit 130 coupled to the signal line 110, which switches the signal line 110 between different signal levels, if the signal line 110 is in an inactive state. For determining whether the signal line is in an inactive state, embodiments of the present invention further comprise a controller circuit 140 comprising an output for a signal indicating whether the signal line is or will be in an inactive state.

Embodiments of the present invention can, for instance, be employed in the field of transmitters for low power fly-by-bus structures with a RC termination.

In other words, embodiments of the present invention are based on detecting inactive states of a single signal line 110, or of different signal lines 110 on the bus and using these states to insert data, which are needed to avoid a DC drift on the bus caused by the RC termination. The corresponding data can be calculated by targeting a certain ratio of 0s and 1s transmitted on every signal line on the bus. As outlined before, the ratio can, for instance, be 50%:50%=1 or any other non-negative or real-valued number.

Further, it should be noted that depending on the over-all delay introduced by an embodiment of an apparatus, the controller circuit 140 is capable of detecting whether the signal line is in an inactive or active state or whether the signal line will be in an active or inactive state. Depending on certain implementation requirements, it might be advisable to implement additional delay circuits or latches in order to ensure a proper synchronization of the signals transmitted over the signal lines. Hence, in such a situation, an embodiment of an apparatus determines the state of the signal line ahead of the corresponding signals sent over the signal line. As a consequence, in such a case the embodiment determines the state the signal line will be in after a certain delay, which can for instance be caused by delays introduced by the concrete implementation.

However, in some embodiments the delay can be so minimal that it is appropriate to speak of an immediate transmission of the signals. In such a case, the embodiment of the apparatus determines the state, the signal line is in, (almost) instantly so that—in practical terms—the control circuit 140 determines the state the signal line is in.

Before describing a second embodiment of the present invention in more detail, it should be noted that objects and structures with the same or similar functional properties are denoted with the same reference signs. Unless explicitly noted otherwise, the description with respect to objects with similar or equal functional properties can be exchanged with respect to each other.

In the following, embodiments of the present invention will be described in more detail. The embodiments relate to the field of bus structures in the field of memory devices. From a protocol point of view, the individual signals on a bus may be active or inactive. Active states are usually characterized by transmitting commands that trigger actions on the bus, whereas inactive states are typically characterized by transmitting commands, which do not trigger actions on the bus. Typical commands in the case of DDR memory buses are transmitting NOP commands (NOP=No Operation) or DES commands (DES=Device Deselect). On many bus systems and especially on the so-called command/address/control bus (CAC bus) of memories, the bus utilization is significantly below 50% on average. Typical values are around 10% to 30%. This means that the individual signals on the bus are inactive for a significant amount of time.

This time of inactivity is used to insert data to avoid or compensate any DC drift of the signal levels on the RC terminated bus caused by the capacitor of the termination. While this is done, care is taken to maintain the inactive nature of the individual signals of the bus.

The inserted data is, in some embodiments of the present invention, determined as follows:

First, the number of transmitted 0s and 1s on every single line is determined or counted. This is either done by counting the transmitted 0s and 1s over a rolling time window and providing the difference of those two numbers (of 0s and 1s, respectively) or by employing a counter used to continuously monitor the delta or difference between the transmitted 0s and 1s. This can, for instance, be implemented by incrementing a counter for each 1, transmitted over the signal line, and by decrementing the counter for each transmitted 0.

In the case of a rolling time window, the number of symbols (or individual signals) transmitted over the signal line, which is taken into account for determining whether a 0 or a 1 should be inserted in an inactive state signal line, is limited. Usually, this can be done by only taking into account a fixed, predetermined, adaptable or programmable number of symbols transmitted over the signal line, starting from the last symbol transmitted over the signal line. This can, for instance, be implemented in hardware by using one or two linear shift registers (LSR) based on latches or flip-flops, along with one or two parallel adders. In the case of a single LSR, the LSR stores the last symbols transmitted over the signal line, wherein the content of the LSR is moved, based on a clock signal of the bus to which the signal line belongs or another clock or reference signal. In the case of only a single LSR, the non-inverting outputs of the latches or flip-flops of the LSR are provided to one parallel adder, while the inverting outputs of the latches or the flip-flops are provided to a second parallel adder. By comparing the output of the two parallel adders, the difference between the transmitted 0s and 1s can be determined, based on the rolling time window represented by the length of the LSR and based on the clock signal used in context with the LSR.

In the case of two LSRs, one LSR stores, based on, for instance, the clock signal of the underlying bus, the transmitted data over the signal line, while the second LSR stores the inverted signals transmitted over the signal line. Once again, by employing two parallel adders and by comparing their outputs, the difference between transmitted 0s and 1s can be determined over the rolling time window defined by the length of the LSRs and the clock signal.

In the case of an adaptable or programmable length or number of transmitted signals or symbols of the rolling time window which permits an implementation of alterable frequencies for an oscillation of the average signal level on the appropriate signal line or signal lines. In other words, by adapting or programming different lengths of the rolling time window, a typical oscillation frequency of the average value or signal level of one, a set of or all the signal lines can be adapted during operation.

Second, based on the resulting delta or difference of transmitted 0s and 1s, it is decided, if a 0 or a 1 should be inserted at the next possible insertion slot. This decision can be done simply by evaluating the sign-bit of the difference or the delta number. An alternative approach is to use individual threshold values for 0-insertions and 1-insertions. For example, if $$\text{number\_of\_1}s - \text{number\_of\_0}s > \text{insertion\_limit\_for\_0}s \qquad (4)$$

then a 0 will be inserted at the next possible insertion slot. Similarly, if $$\text{number\_of\_1}s - \text{number\_of\_0}s < \text{insertion\_limit\_for\_1}s \qquad (5)$$

then, a 1 will be inserted at the next possible insertion slot, wherein number_of_1s, number_of_0s, insertion_limit_for_0s and insertion_limit_for_1s represent the appropriate numbers of the number of 1s transmitted over the signal line, the number of 0s transmitted over the signal line, the insertion limit for inserting the 0s and the insertion limit for inserting 1s, respectively.

As described above, the insertion decision can be done for every signal individually. However, it is also possible to do the insertion decision for a group of signals. If, for example, the group of signals or signal lines, which might be physically separated signal lines, are encoding the command information on the bus, the decision if and what to insert can be based on a priority decision. In particular, for every signal line, the absolute deviation from the insertion limit of 0 s (insertion_limit_for_0 s) and/or the insertion limit for 1 s (insertion_limit_for_1 s), as defined under context of equations (4) and (5) is calculated. The signal which has the highest absolute deviation gets priority and dictates the signal level at the next possible insertion slot. Based on this signal to be entered or data, the remaining signals are either free for insertion as well, or must be chosen according to a special pattern to insert a certain state in order to maintain the inactive nature of the group of signals from a protocol point of view. Details and examples will be outlined, for instance for a DDR2 memory system, in the context of FIG. 2.

The insertion limit, insertion_limit_for_0s and insertion_limit_for_1s may be set to a fixed value. Alternatively, one or both of these values can be stored within a register to allow a flexible setting for every application. In other words, the insertion limits (insertion_limit_for_0s and insertion_limit_for_1s) can be implemented as fixed values, adaptable or programmable values. Moreover, the insertion limits may be changed or altered during an operation in order to implement more sophisticated limits, for example, a hysteretic behavior or a hystereses allowing for compensating or altering the charge on the capacitor of the RC termination of the bus to which the signal line 110 belongs.

Also, and as described above, the inserted signal level or data may be evaluated for every single insertion slot. This may result in an operation mode where alternating 0s and 1s, are inserted, while the delta or difference of transmitted 0s and 1s are toggled around the insertion limit. Alternatively, an insertion decision can be utilized for more than one insertion slot. By such an approach, it can be achieved that the difference between the transmitted 0s and 1s is moved straight back to 0 or another target value, depending on a concrete implementation, once a certain limit is reached.

The next possible insertion slot itself is determined by decoding individual signals or a group of signals or all signals on the bus. Depending on the encoding of the protocol, certain commands or certain states indicate an inactive state or a temporary inactive state on individual signal lines, groups of signal lines or all signal lines. As soon as such an inactive state is detected by the controller circuit 140, the corresponding signals or signal lines are marked as "ready for insertion" by outputting the signal or the switch signal to the internal signal line 150, providing the signal to the switching circuit 130. As soon as it is decoded that the state is active, the corresponding signals are marked as "no insertion allowed" which can for instance be achieved by altering the signal provided to the output of the controller circuit 140.

If the marking on the signal is "no insertion allowed", the original data provided by the (optional) incoming signal line 170 is driven out or provided to the channel to maintain the original encoded command. In other words, if the signals from the controller circuit 140 indicates that no insertion is allowed, the signal from the incoming signal line 170 is provided by the switching circuit 130 in the embodiment shown in FIG. 1 to the signal line 110 via the output 120 of the apparatus.

However, if the marking on the signal is "ready for insertion" which is indicated by the signal on the internal signal line 150, a 0 or a 1 is inserted depending on the algorithm described above. In the context of FIG. 2 to FIG. 12, further embodiments in the context of a transmitter for an advanced memory buffer (AMB) for a memory module FBDIMM will be discussed in more detail.

As indicated before, the apparatus 100 shown in the embodiment of FIG. 1, the 0s and 1s may be represented in any form on the signal lines or signals. Hence, especially, the signals carried on the signal line 110 may be mainly characterized by a voltage level or a current provided to the signal line 110. Also, single ended or differential signaling techniques may be used for the signal lines and the signals. Full swing signals or reduced swing signals, can also be employed. Finally, as explained above, embodiments of the present invention are also applicable in the field of multi-level signals.

Embodiments of the present invention, hence, enable the use of a RC termination even during long periods of inactivity, by ensuring an approximately equal number of 0s and 1s, on average, on all signals of the bus, including in the case of memory systems, the chip select lines. By this, the RC termination can be used to eliminate the DC power dissipation in high-speed fly-by-bus structures. In the following second embodiment of the apparatus 100, will be described, which implements an embodiment of a method to reduce the power of a standard FBDIMM by a RC termination of the command/address bus (CA bus) and compensating the induced inter-signal-interference (ISI) by equalized driver pre-charged/toggling and selectively switching between no operation commands (NOP) and device deselect (DES).

With respect to FIGS. 2 to 12, an implementation example as an embodiment of an inventive apparatus 100, suited for a DDR2 SDRAM bus, will be described. As outlined before, it should be noted that objects and structures with the same or similar functional properties are denoted with the same reference signs. Unless explicitly noted otherwise, the description with respect to objects with similar or equal functional properties can be exchanged with respect to each other.

FIG. 2 shows an overview of the command of DDR2 SDRAM, which are characterized by different signal levels on the signal lines of the command bus and the address bus.

More precisely, the table shown in FIG. 2 represents a truth table of a DDR2 SDRAM device which are explained not only by their function, but also by their clock enabling signal CKE, the chip select signal CS, the row address strobe signal RAS, the column address strobe signal (CAS), the write enable signal (WE), the bank address signal (BAn, wherein n is an integer in the range from 0 to a maximum value (denoted in FIG. 2 as x), and the address lines Axx-A11, A10 and A9-A0. The table of FIG. 2 is taken from the DDR2 SDRAM specification JEDEC (JESD79-2C). The last column of the table shown in FIG. 2 refers to notes explained in the mentioned specification.

It should be noted that the clock-enabling signal CKE is defined with respect to both, the previous cycle and the current cycle. Furthermore, the table shown in FIG. 2 defines the chip select signal CS, the row address strobe signal RAS, the column address strobe signal CAS and the write enable signal WE in terms of their binary complementary value indicated in the table shown in FIG. 2 by a horizontal line over the signal abbreviation. In the following, the signal values corresponding to a signal line will be indicated by a hash placed after the abbreviation for the signal line (e.g. CS#). Furthermore, in the table shown in FIG. 2, the "H" indicates the high signal level or a 1, whereas an "L" indicates a low signal level or a 0. An "X" indicates an arbitrary value, which can be either high "H" (1) or low "L" (0).

The command of a DDR2 SDRAM, which allow a state insertion, is highlighted in the function column. The signals or signal lines of a command/address/control bus, which are marked as "ready for insertion" are highlighted in the remaining columns of the table.

To be more precise, the Single Bank Precharge command 200, the Precharge all Banks 210, the No Operation command 230 and the Device Deselect 240 allow a state insertion, and hence, a switching between signal levels on at least some of the signal lines.

To be even more precise, the Single Bank Precharge command 200 allows a switching of the signal levels of an address lines (Axx-A11 and A9-A0) of the address bus. The Precharge all Banks command 210 enables a state insertion on the bank address lines BA0 to BAx, the address lines Axx-A11 and A9-A0. The No Operation command 230 allows an arbitrary signal level on the bank address lines BA0-BAx, the address lines A0-Axx. However, in the framework of a No Operation command 230, the (inverse) of the chip select signal CS, the row address strobe signal RAS, the column address strobe signal CAS and the write enable signal WE are predefined. The Device Deselect command 240 only requires a high level on the (inverted) chip select line CS, whereas the other signal lines (RAS, CAS, WE, BA0-BAx, A0-Axx) can assume arbitrary values. Hence, in the following embodiment, commands of the DDR2 SDRAM, which allows state insertions, are highlighted.

Figure 3:
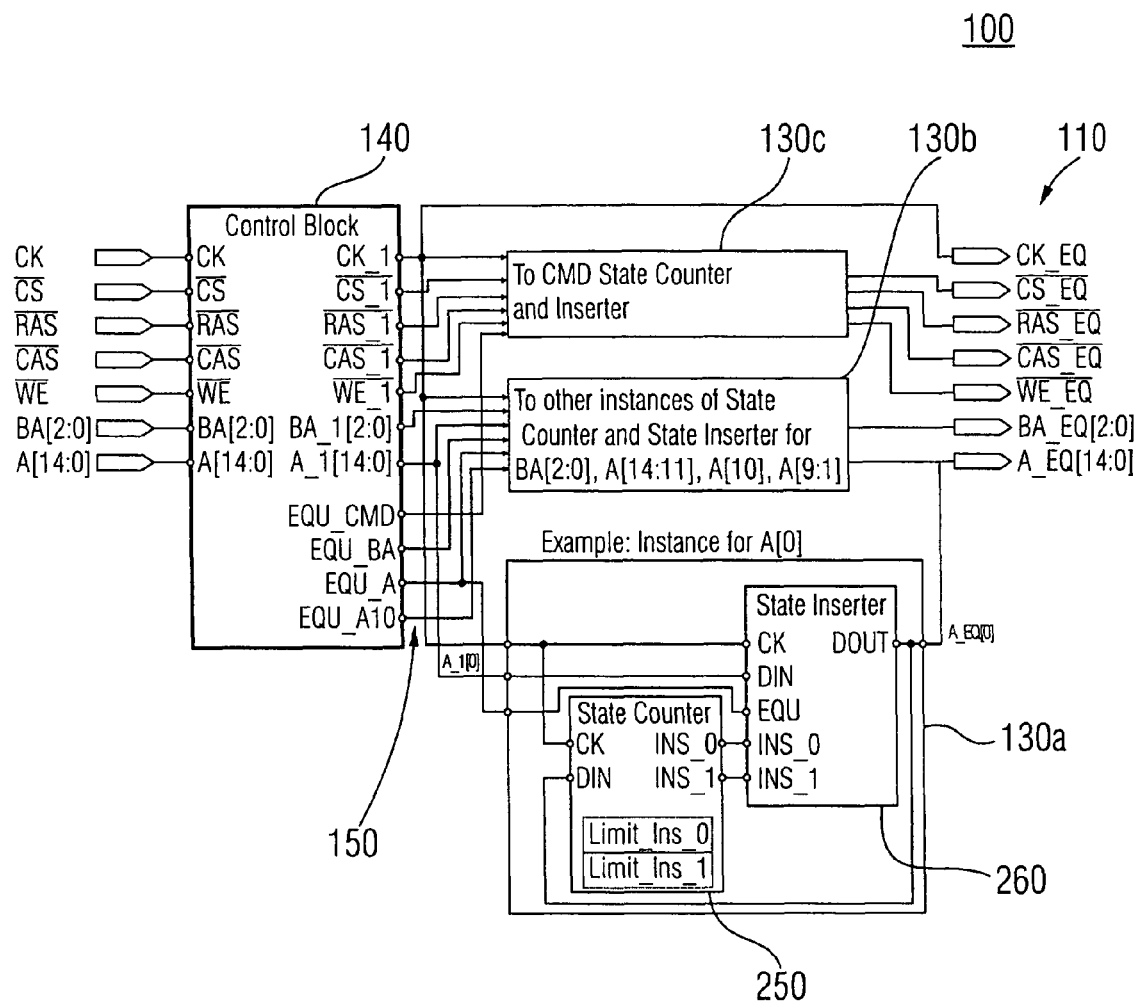
FIG. 3 shows a block diagram of an embodiment of an apparatus for providing a signal for transmission via a signal line in the form of a transmitter.

FIG. 3 shows a block diagram for an embodiment of an inventive apparatus 100 for a transmitter, which is also referred to as a state equalizer. To be more precise, the state equalizer 100 comprises a control block 140 as the control circuit, along with three switching circuits 130a, 130b, and 130c. The embodiment shown in FIG. 3 shows, besides the regular circuitry for a transmitter, the control block 140 and several switching circuits 130a to 103c, each of which comprises a state counter 250 and a state inserter 260, which are only shown for the switching circuit 130a in FIG. 3. However, the embodiment of the apparatus 100 comprises several state counters and state inserters for the address signals A[14:0] and the bank address signals BA[2:0], and a command state counter and command state inserter for the commands signals (CS#, RAS#, CAS# and WE#). In this context, it should be noted that "#" represents the inverse or complementary of the corresponding signal on the signal line, although for simplicity reasons the signal lines can be referred to by both references (signal and complementary signal).

The switching circuit 130b comprising the aforementioned CMD state counter and the CMD state inserter will be described in more detail in the context of FIG. 7. The switching circuit for the bank address lines and the address lines is formed by the switching circuits 130a and 130c. To be more precise, as an example, the switching circuit 130a for the address line A[0] has been schematically taken out of the switching circuit for the address lines and the bank address lines, for illustration purposes only. Hence, the switching circuit 130a for the address line A[0], the switching circuit 130c for the other address lines A[14:1] and the bank address lines BA[2:0] are handled by the switching circuit 130c.

In this particular embodiment, the original signals CK (clock signals), CS#, RAS#, CAS#, WE#, BA [2:0] and the address line A[14:0] are synchronously clocked into the control block 140 using the clock signal CK. The control block 140 furthermore comprises an appropriate number of outputs, which pass on the mentioned signals to the switching circuits 130a, 130b, and 130c.

As FIG. 3 shows a block diagram of an embodiment of an apparatus 100 as comprised in a transmitter of a bus structure of a memory system, the regular circuitry for a transmitter is not shown in FIG. 3 for simplicity only. The apparatus 100 for the transmitter provides the command/address bus (CS#, RAS#, CAS#, WE#, BA[2:0] and A[14:0]) or, as described in the context of FIG. 2, complimentary signal lines along with a clock signal line CK to the control block 140. In this context, it should be noted that for simplicity, the address line A10/AP is shown as "A[10]" in FIG. 3. The control block 140 comprises, for each signal line of the command/address bus, an output providing a signal, which is indicated in FIG. 3 and in the rest of the figures of the present application, by the additional supplement "_1". As a consequence, the clock signal CK provided to the control block 140 is output by the control block 140 as the clock signal CK_1. Accordingly, the signals of the signal lines of the address bus A[14:0] are output by the control block 140 as the signal lines or rather signals A_1[14:0]. Also the other signal line of a command/address bus provided to the control block 140 are output by the control block 140, accordingly.

Furthermore, the control block 140, comprises four additional outputs EQU_CMD, EQU_BA, EQU_A and EQU_A10 providing switch signals or rather signals designated according to the outputs and provided to a set of four internal signal lines 150. The apparatus 100 shown in FIG. 3, furthermore comprises several state counters and state inserters comprised in a set of switching circuits 130 for the address signals A[14:0] and bank address signals BA[2:0], as well as a command state counter or CMD state counter and a command state inserter for the command signals (CS#, RAS#, CAS# and WE#). However, for illustration purposes only, FIG. 3 shows three distinct switching circuits 130a, 130b and 130c, wherein only in the case of the switching circuit 130a the internal structure with a state counter 250 and a state inserter 260 is illustrated in FIG. 3.

To be more precise, the switching circuit 130a shows the switching circuit for the address line A[0] (shown as instance for A[0]). The switching circuit 130b comprises similar state counters and state inserters for the rest of the signal lines of the address bus A[14:1], BA[2:0], while the switching circuit 130c comprises a state counter and a state inserter for the signal lines of the command bus, which will be described in more detail in the context of FIG. 7 and which are also designated as CMD state counter and inserter.

Turning to the switching circuit 130a for the signal line of the address bus A[0], the switching circuit 130a is connected to the clock signal line CK_1, the signal line of the address bus A_1[0] and the switch signal EQU_A output by the control block 140. Accordingly, the switching circuit 130b for the rest of the signal lines of the address bus is connected to the outputs of the controller block 140, providing the appropriated signals, as well as to the outputs for the switch signals concerning the signal lines of the address bus and the clock signal line. To be more precise, the switching circuit 130b is connected to the signal lines A_1[14:1], BA_1[2:0], to the clock signal line CK_1 and the two internal signal lines 150 conveying the switch signals EQU_BA and EQU_A. Similarly, the switching circuit 130c is also connected to the clock signal line CK_1, the signal lines of the command bus as output by the control block 140, CS_1#, RAS_1#, CAS_1#, WE_1# and the switch signal EQU_CMD provided to the internal signal line 150. However, as indicated earlier, the switching circuit 130c will be described in more detail in the context of FIG. 7.

The clock signal line CK_1 as output by the control block is, furthermore, directly connected to one of the signal lines 110, output by the apparatus 100. To be more precise, the clock signal line conveying the clock CK_1 is connected to the signal line CK_EQ. Accordingly, the signal line output by the switching circuit 130a, 130b and 130c are connected to a set of respective signal lines 110, which are denoted by the additional supplement "EQ" in FIG. 3 and the rest of the application. Furthermore, for instance, the chip select signal CS# or rather the inverse signal is delayed by the control block 140, which provides the delayed chip select signal CS_1# to the switching circuit 130c. the switching circuit 130c then outputs an "equalized" chip select signal denoted at CS_EQ#. Accordingly, also the rest of the signal lines of the command/address bus are output by the respective switching circuits 130a, 130b and 130c, as an equalized version indicated by the "_EQ" (e.g. RAS_EQ# as the equalized version of the row address strobe signal RAS#).

To summarize, the additional appendix "_1" refers to a delayed signal or a signal line conveying the appropriate delayed signal as delayed by the control block 140, while the appendix "_EQ" indicates and equalized version, which comprises a ratio which is "ideally" identical or as close as possible to the target ratio as explained in the context of the embodiment shown in FIG. 1 with respect to the time the signal line spends at the respective signal levels. The prefix "EQU_" describes, as defined above, the switch signals or signals provided by the control block 140 to the set of internal signal lines 150 indicating an inactive state.

Turning to the switching circuit 130a, which comprises the state counter 250 and the state inserter 260, both the state counter 250 and the state inserter 260, are connected to the clock signal line CK_1. The inputs of both the state counter 250 and the state inserter 260 are denoted as CK. In the embodiment shown in FIG. 3, the state counter 250 furthermore comprises two registers denoted as "Limit_Ins_0" and "Limit_Ins_1" and which contain the insertion limits, as described above for a 0 and 1. The state counter 250 furthermore comprises two outputs INS_0 and INS_1, which are connected to appropriate inputs of the state inserter 260 also denoted as INS_0 and INS_1. Over the signal lines connecting the respective inputs of the state inserter 260 and outputs of the state counter 250, signals are provided to the state inserter 260 indicating whether in the next idle state or inactive state a 0 or a 1 should be inserted by the switching circuit 130 in FIG. 3 into the signal line 110 conveying the signal A_EQ[0]. To achieve this, the switching circuit 130a is connected to an output DOUT of the state inserter 260, which is not only connected to the signal line 110, but also feedback to an input DIN of the state counter 250, on the basis of which the state counter 250 counts the number of 0s and 1s, decides what to output in the next "ready for insertion" slot and provides the state inserter 260 with the appropriate signals indicating the result of the decision in the form of the signals at the output INS_0 and INS_1.

The state inserter 260 furthermore comprises an input DIN, to which the signal line of the appropriate bus is connected and an input EQU which is connected to the appropriate internal signal line 150 conveying the switch signal or signal from the control block 140. In the case of a switching circuit 130a, for the signal line A[0] of the address bus, the state inserter 260 is connected to the output of the signal line A_1[0] of the control block 140 and the input EQU of the state inserter 260 is connected to the output EQU_A of the control bock 140 via one of the internal signal lines 150. As a consequence, whenever the control block 140 indicates over the output EQU_A that the bus or rather the signal line of the bus is or will be in an active state, the state or rather the signal of the signal line A[0], in its delayed form, is output by the state inserter 260 at its output DOUT and, hence, provided to the signal line 110.

As indicated earlier, especially the switching circuit 130b comprises for each signal line connected to the switching circuit 130b of the control/address bus, also an appropriate state counter, and an appropriate state inserter. Also the switching circuit 130c for the command bus comprises a state counter and state inserter, which will be explained in more detail in the context of FIG. 7.

A final remark should be made with respect to the signal line for the clock signal CK. The clock signal CK_1, in its delayed form, is output by the control block 140 is directly provided to the signal line for the clock signal CK_EQ, which is permissible as the clock signal toggles between the states of the signal levels 0 and 1, to indicate the clock. Hence, calling the clock signal in its delayed form CK_1 also an equalized clock signal CK_EQ is, thus, also permissible. However, if necessary in a concrete implementation, additional delays not shown in FIG. 3 might be advisable to introduce a further delay or an additional phase shift to the clock signal line to compensate the delay introduced by the switching circuit 130. In this context, it should be noted that additional signals (e.g. reset signals) and circuitry may be used or may be advisable for initialization of the blocks, especially the control block 140, the switching circuits 130a, 130b and 130c, the state counter 250 and the state inserter 260. Furthermore, it should be noted that additional signals and circuitry might also be used or might be advisable for synchronization of the mentioned blocks.

Although, in the particular embodiment shown in FIGS. 3 to 12, the original signals are synchronously clocked into the control block 140, using the clock signal CK. Also the output signals of the apparatus 100 (CS_EQ#, RAS_EQ#, CAS_EQ#, WE_EQ#, BA_EQ[2:0] and A_EQ[14:0]) are provided synchronously to the output clock CK_EQ. However, it is clear that alternative embodiments can also be applied in the field of asynchronous or other synchronous methods for transmitting signals. Hence, further asynchronous or other synchronous methods may be used for an implementation of an embodiment of the invention.

To summarize, on the transmitter of a fly-by-bus, three additional circuit blocks are used besides the regular transmitter blocks: a state counter (cf. state counter 250 of a switching circuit 130a in FIG. 3) a state inserter (cf. state inserter 260 in FIG. 3) and a control block 140. As will be outlined in more detail below, one state counter is used in the framework of the embodiment as described below for every signal on the fly-by-bus. This counter is counting the number of transmitted 0s and 1s over a rolling time window, or by using a counter to continuously monitor the difference between transmitted 0s and 1s. Furthermore, one state inserter, like the state inserter 260 for the signal line of the address bus A[0] is used for every signal on the fly-by-bus. Upon request of the control blocks, the state inserter 260 inserts states on every signal line such that the number of transmitted 0s and 1s approaches a fixed, adaptable or programmable ratio, which can for instance, be 1 so that the number of transmitted 0s and 1s approaches an equilibrium. The inserted states can also be enforced by external blocks, e.g. other control blocks 140 and/or other insertion blocks.

The control block 140 is detecting if the bus is or will be active, i.e., transmitting commands that trigger actions on the bus, or inactive, i.e., transmitting NOP commands or DES commands, in case of a DDR memory bus. As will be outlined in more detail later, when the bus is inactive, the following actions are taken.

The state inserters for address lines, like the state inserter 260 for the address line A[0] are triggered to insert states needed to reach an adaptable or programmable ratio, e.g. equilibrium of transmitted 0s and 1s. Next, the state inserters for commands and control lines are controlled in a way that toggle between a NOP command and a DES command, as will be described in the context of FIGS. 7, 8, 9 and 10, if the chip select line (CS) is driven active, the active command lines are driven in a way to apply a NOP command. In other words, as FIG. 2 also shows, or the NOP command 230, when the chip select line (CS) is driven active (H or 1), so that the inverse is L, the other signal lines of the command/control bus RAS, CAS, WE have to be driven to L or 0 so that the inverse signals are H or 1, in order to convey a NOP command 230 over the command/control bus.

If, however, the chip select line CS is driven inactive so that the inverse of the chip select line CS is in a high state (H or 1), the other command lines are driven in a way to achieve an equilibrium or another fixed, adaptable, or programmable ratio between the transmitted 0s and 1s, as indicated in Table 2. To be more precise, in this case, a Device Deselect command or DES command 240 is provided to the command control bus. As the table in FIG. 2 also shows, in this context, the signals of the signal lines RAS#, CAS# and WE# can be driven to any state.

Instead of showing flowcharts describing the behavior of the switching circuits 130, the state counter 250 and the state inserter 260, as well as the control block 240, FIGS. 4 to 6 and FIGS. 8 to 10, show a behavioral description of the previously mentioned blocks, circuits and components according to a behavioral description language, according to the Verilog standard. To be more precise, the behavioral description of the blocks of the embodiments shown in FIG. 3, are given according to the Verilog standard IEEE standard 1364-1995. However, the newer version of the standard, the IEEE standard 1364-2001, can also be used, as the IEEE standard 1364-2001 represents an over set of the IEEE standard 1364-1995.

Figure 4:
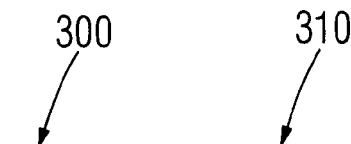
FIG. 4 shows a behavioral description of a control block of the embodiment of FIG. 3.

FIG. 4 shows a behavioral description of the control block 140 of the embodiment of the apparatus shown in FIG. 3. The signal "equ_cmd", "equ_ba", "equ_a", and "equ_a10" are highlighting or indicating the corresponding signals, or group of signals "CS#, RAS#, CAS#, WE#" and "BA[2:0] and A[14:11,9,0]" and "A[10]" either as "ready for insertion" or as "no insertion allowed", respectively. The decoding of the respective commands and the highlighting or indication of the output signals is done, following the table shown in FIG. 2.

In this context, it should be noted that in the behavioral description language shown in FIG. 4 as well as the other behavioral descriptions shown in FIGS. 5, 6, 8, 9 and 10, the signals, the signal lines, the signal values or the signal levels are indicated by small letters compared to FIGS. 1, 2, 3, 7, 11, and 12, in which capital letters are used.

Although the behavioral description given in FIG. 4 complies with the Verilog standard IEEE standard 1364-1995, a short introduction based on the code shown in FIG. 4 will be given to facilitate a better understanding of the behavior of the state counters, the state inserters, and the control blocks. However, the following brief introduction cannot replace a more founded introduction to the Verilog standard IEEE 1364-1995 or IEEE standard 1364-2001.

The code shown in FIG. 4 is arranged according to line numbers 300 followed by instructions 310 for each line. In this context, it should be noted that remarks and comments, which do not comprise executable instructions, begin with "//" as shown, for instance in line 34. Furthermore, an apostrophe indicates a delimiter. User-defined functions are indicated by capital letters only. An example represents the function CTRLBLKDLYCK shown in line 32, which represents a delay (DLY) of the control block 140 (CTRLBLK) concerning the clock signal (CK). To be more precise, line 32 defines or assigns to the variable or signal CK_1, a delayed version of the clock signal CK by the application of the user-defined function CTRLBLKDLYCK. Further examples of user-defined functions are used, for instance, in lines 36 to 38, wherein the user-defined function CTRLBLKDLY represents a further delay in the framework of the control block 140.

Numbers are represented by an expression indicating first the number of bits, followed by an apostrophe, followed by "b" for a binary representation of the number and the actual number given in terms of 0s and 1s in the case of a binary number. In this context, it should be noted that "_" is ignored and that a question mark "?" represents any number. So, as a consequence, the expression "5'b=1111_?" represents a five-digit binary number, wherein the first four bits are represented by the bits 1111 with the fifth bit being either a 0 or a 1.

As previously mentioned, in line 32 of the behavioral description in FIG. 4, the clock signal CK is assigned to the signal line CK_1 at the output of the control block 140 in a delayed form by application of the user-defined function CTRLBLKDLYCK. The routine starting at line 35 is always executed, when the clock signal CK exhibits a positive edge (POSEDGE). In line 36, the signals CS#, RAS#, CAS#, WE# represented by the variables cs_n, ras_n, cas_n, we_n, respectively, are assigned to the variables or signal lines at the output of control block 140, cs_1_n, ras_1_n, cas_1_n, we_1_n, in a delayed form by application of the user-defined function CTRLBLKDLY, respectively, wherein the supplement "n" indicates the complementary or negative value of the respective variable, just as "#" does with respect to the signals. Accordingly, in the lines 37 and 38, bank address lines and the address lines represented by the variables BA and A, respectively, are attributed to the signal lines of variables ba_1, a_1 by application of the user defined function CTRLBLKDLY in a delayed form.

Lines 40 to 56 comprise a case differentiation with respect to the signal of the signal lines of the command/control bus, comprising the signal lines CS#, RAS#, CAS#, WE#, A10. In this context it should further be noted that the additional supplement "_n" indicates the complementary value of the respective value. As a consequence, for instance, the variable cs_n comprises the complimentary signal of the chip select signal CS, which is also referred to as CS#. In other words, the variable of signal line cs_n more or less equals the complimentary of the signal CS or the signal CS with a horizontal line above, as indicated in the table of FIG. 2.

As an example, if the inverse or negative CS signal is at a high level (=H or 1) in case of a positive edge of the clock signal (cf. line 35), the command/control bus conveys a DES command, as indicated by the comment in line 41. In this case, all the rest of the signal lines of the command/control bus, as well as, the signal lines of the address bus, can be switched to an arbitrary signal level according to the need for equalization. As a consequence, all the switch signals or signals are output by the controller circuit 140 to the internal signal lines 150, can be set to high (=H or 1). Hence, all signals or variables indicating that an insertion is allowable will be set to 1. Accordingly, in line 42 the variables equ_cmd, equ_ba, equ_a and equ_a10 will be set too high as indicated by the number defined by "4'b 1111. However, this is also done with a delay defined by the user-defined function CTRLBLKDLY.

All user-defined delay functions (e.g. CTRLBLKDLY and CTRLBLKDLYCK) are introduced into the behavioral description to accommodate for delays introduced by concrete implementations of an embodiment of an apparatus 100. As will be discussed in the context of FIGS. 11 and 12, the user-defined delay functions are in the behavioral description shown in FIGS. 4 to 6 and 8 to 10, to accommodate for an overall delay of one cycle. This is, however, only an exemplary overall delay, which has been implemented into the behavioral description to illustrate the signals in FIGS. 11 and 12, as will be discussed in the context of these figures. In concrete implementations of an embodiment, however, additional signals and circuitry may be used for synchronizing the blocks, as discussed earlier. A second example represents the Single Bank Precharge command 200 which is characterized by the fact that only the inverse of the column address strobe signal (CAS) is at a high signal level (=H or 1), while the rest of the signal lines of the command/control bus is at a low signal level (=L or 0). Hence, the behavioral description of lines 47 to 49 will be executed accordingly. As the table shown in FIG. 2 indicates, only the signal line of the address bus, without the signal line A10, may comprise arbitrary values, and hence the use for signal equalization. As a consequence, in line 48 only the output signal EQU_A to the variable equ_a is set to 1, while the rest of the switching signals or switch signals or signals will be set to 0.

However, if none of the commands shown in FIG. 2 apply, the command/control bus conveys a state indicative of a command, which is to be transported. As a consequence, lines 53 to 55 defined as a so-called default-case, in which all switch signals of the control block 140 are set to 0. As seen before, signal line A10 was associated with the command/control bus here, although it is usually considered to be part of the address bus.

FIG. 5 shows a further behavioral description according to the Verilog standard mentioned above, of the state counter block 250 of the embodiment shown in FIG. 3. Once again, with every rising clock edge (cf. line 27 and the corresponding end instruction in line 65), a counter ctr_1m0 counting the difference or delta between transmitted 1s and 0s is incremented or decremented. The label ctr_1m0 indicates a counter which is incremented whenever at the input din or DIN of a state counter 250, a high signal level (=H or 1) is present, while the counter is decremented by 1, whenever a 0 or a low signal level is present at the input din or DIN. Hence, the label "ctr_1m0" can be read as counter for "1s-0s".

In this context, it should be noted that in the Verilog standard mentioned above, a comparison is indicated by three consecutive equal signs ("==="). As a consequence, line 29 represents the case differentiation indicating whether a 1 ("1'b1") is present at the input din or DIN represented by the variable din of the state counter 250. Again, a further user-defined delay function is applied in the lines 30, 32 and 34, which delays the corresponding signal by, for instance, half a cycle, hence being labeled as CTRDLYHALF.

Furthermore, lines 28 to 34 representing the counter clearly shows that the counter is based on the clock signal CK, as lines 28 to 34 are only carried out when a positive edge of the clock signal occurs (cf. line 27). Hence, the counter or the state counter 250 of the embodiment of the apparatus shown in FIG. 3 is based on the clock signal. However, in principle any clock signal capable of indicating a small but finite interval in time can be used. Alternatively, any other clock or timer can be used to measure the time during which the signal line 110 is at the respective signal level.

In lines 36 to 37, the second occurrence of a user-defined delay function CTRDLYHALF indicates a further delay of the processing by approximately half a cycle caused by the delay of a concrete implementation of an embodiment of a state counter.

Apart from lines 38 to 42, which evaluate the case in which the difference of the number of transmitted 0s and 1s is equal to zero, so that nothing should be inserted, the lines 43 to 64 represent the counter result being compared with the insertion limits for 0s (limit_ins_0) and the insertion limit for 1s (limit_ins_1). The result of this comparison then determines or impacts if an insertion is recommended at all, and if so, if it is a 0 or a 1, which is supposed to be inserted. To be more precise, once again delayed by the user-defined delay function CTRDLYHALF, the two signal lines connecting the two outputs of the state counter 250 and the two inputs of the state inserter 260, called ins_0 and ins_1 (labeled in FIG. 3 as "INS_0" and "INS_1"), respectively, are set to 1, if the appropriate signal level should be inserted or to 0, if the appropriate or respective signal level is not required to be inserted, based on the limits discussed. Once again, the variables associated with the signals exchanged between the state counter 250 and the state inserter 260 are labeled with small characters compared to the signals, signal lines, inputs or outputs, as described, for example, in the framework of FIG. 3.

To summarize, if the number of transmitted 1s exceeds the sum of the number of transmitted 0s and the limit for insertion of 1s, the signal ins_0 is set to 1 (cf. line 47 with the number "1'b1"), while the signal ins_1 is set to 0 (cf. line 48, with the number "1'b0"). Accordingly, if the number of transmitted 0s exceeds the sum of the number of transmitted 1s and the insertion limit for 1s, the signal ins_1 is set to 1 (cf. line 58, number "1'b1") and the signal ins_0 is set to 0 (cf. line 59, number "1'b0").

Figure 6:
FIG. 6 shows the behavioral description of a state insertion block of the embodiment shown in FIG. 3.

FIG. 6 shows a behavioral description of a state insertion block, for instance, the state inserter 260 of the embodiment of the apparatus shown in FIG. 3. Once again, in response to a positive edge of a clock signal CK (cf. line 17), the state inserter 260 becomes active. However, only if the control block 140 allows an insertion at all, via the signal EQU, represented by the variable equ, is it decided if a 0 or a 1, or the original data, provided to the input din of the state inserter 260 are to be transmitted.

If the state inserter 260 is described with respect to its behavior by the instructions shown in FIG. 6, the variable of signal equ is provided with the signal, signal line, or variable equ_a, as shown in FIG. 3. The decision, if a 0, a 1 or the original data provided at the input din, are to be transmitted, depends on the recommendation of the state counter block 250, as described in the context of its behavior provided in FIG. 5. To be more precise, the state inserter 260 will output the data provided to its input din if the signals at the input ins_0 and ins_1 are both equal to 0. Also, if no insertion is allowed, which is indicated by the control block 140 by providing the appropriate switch signal or signal, represented by the variable equ being equal to 0, the original data provided to the input din will be transmitted, and hence, output dout at the output DOUT (corresponding to the variable dout) of the state inserter 260. Furthermore, the instruction shown in FIG. 6 introduces a new user-defined delay function of the insertion block, the inserter or state inserter called INSERTERDLY.

Figure 7:
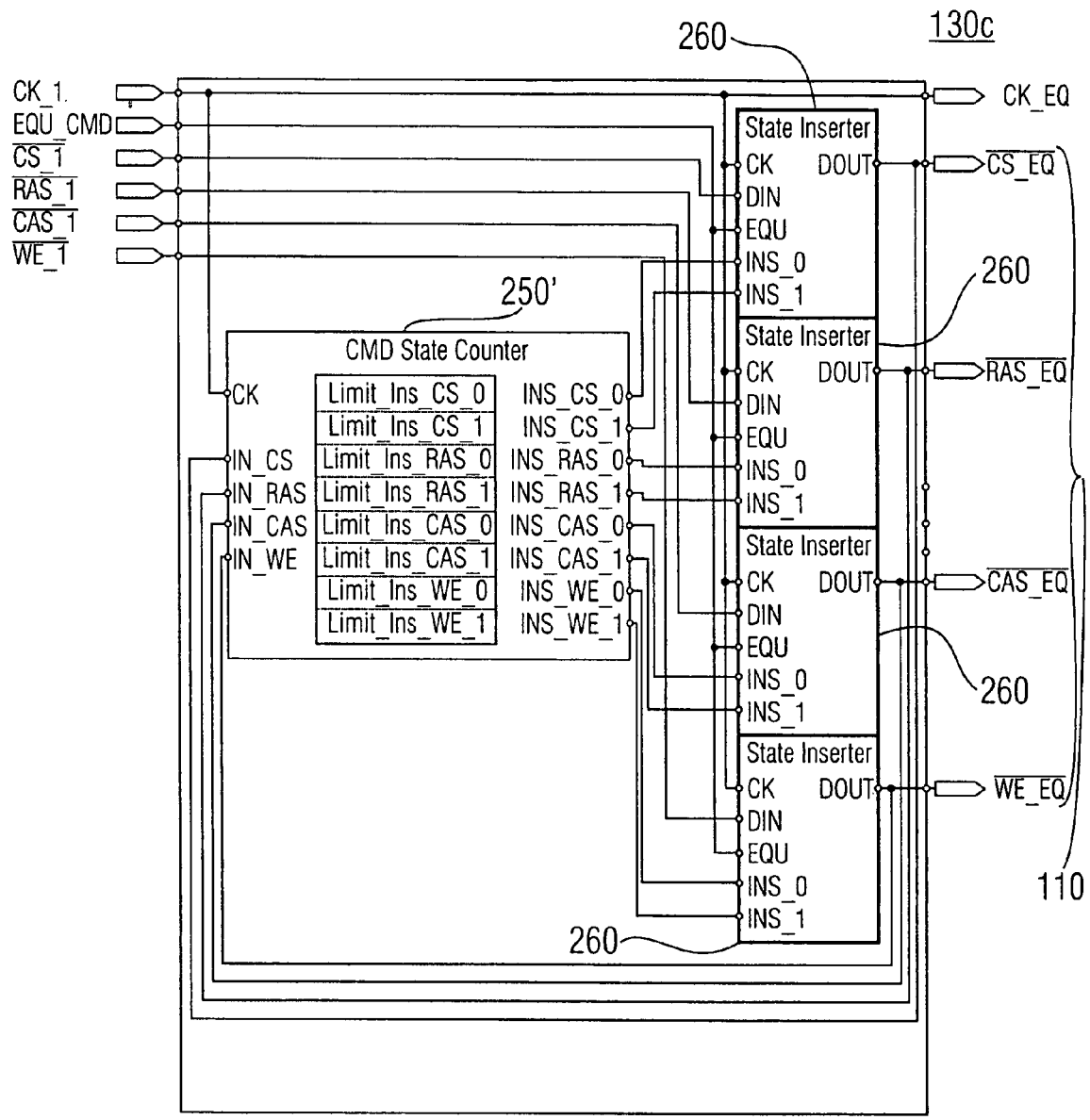
FIG. 7 shows a block diagram of a command state counter and inserter of the embodiment shown in FIG. 3.

FIG. 7 shows a block diagram of the switching circuit 130c comprising a command state counter 250' (CMD state counter) and four state inserters 260. To be more precise, FIG. 7 shows the switching circuit 130c, for the command/control bus of the embodiment of the apparatus 100, shown in more detail in FIG. 3. As mentioned in the context of FIG. 3, additional signals (e.g. a reset signal or reset signals) and circuitry may be used or advisable for initialization of the blocks, e.g. the state inserter 260 or the CMD state counter 250'. Furthermore, it should be noted that additional signals and circuitry may also be used or be advisable for synchronization of the blocks mentioned. In other words, FIG. 7 shows the switching circuit 130c, which is also referred to as a state equalizer.

The switching circuit 130c, or rather the block diagram of the state equalizer for the command signals CS#, RAS#, CAS#, and WE#, is provided with the delayed clock signal CK_1, the switch signal or signal EQU_CMD from the control block 140, indicating whether the command/control bus is or will be in an inactive state, and the four signal lines previously mentioned of the command/control bus in their delayed form, as indicated by the additional terms "_1".

The four state inserters 260 comprised in the switching circuit 130c correspond to the state inserter 260 shown in FIG. 3, as explained in the context of the switching circuit 130a for the address signal line A0. Furthermore, the behavior of the four state inserters 260 is described by the behavioral description given in FIG. 6.

To be more precise, each of the state inserters 260 is provided with the delayed clock signal CK_1 at the inputs CK of each of the state inserters 260. Furthermore, each of the state inserters 260 is connected to the switch signal or signal EQU_CMD via its input EQU. However, as each of the state inserters 260 is connected to a different signal line 110 with their respective outputs DOUT, each of the inputs DIN is connected to one of the signal lines conveying the respective command signal or controlling signal in their delayed forms. As an example, the topmost state inserter 260, shown in FIG. 7, is connected to the chip select signal line CS_1# via the input DIN of the state inserter 260, as provided by the control block 140. In other words, the topmost state inserter 260 is provided with the delayed chip select signal CS_1. Accordingly, the input of the topmost chip state inserter 260 provides the chip select signal in its equalized form to the respective signal line 110, in its equalized form, as indicated by the label CS_EQ#.

Furthermore, each of the state inserters 260 is connected via its inputs INS_0 and INS_1, to an appropriate set of outputs of the command state counter 250'. The command state counter 250' comprises each of the four signal lines of the command bus (CS, RAS, CAS, WE), an output indicating that in the next "ready for insertion" slot a 0 is supposed to be inserted and an output for a signal indicating that in the next "ready for insertion" slot, a 1 should be inserted. As a consequence, the command state counter 250' comprises 8 outputs INS_CS_0, INS_CS_1, INS_RAS_0, INS_RAS_1, INS_CAS_0, INS_CAS_1, INS_WE_0 and INS_WE_1.

The command state counter 250' furthermore comprises an input CK for the clock signal in its delayed form CK_1, as well as four inputs IN_CS, IN_RAS, IN_RAS, IN_CAS, and IN_WE, for each of the four signals provided by the four state inserters 260 to the respective signal lines 110, to which the aforementioned inputs are also connected. This, feedback provides the command state counter 250' with the possibility of counting the transmitted 0s and 1s, sent over the four signal lines 110 CS_EQ#, RAS_EQ#, CAS_EQ# and WE_EQ#, to which the four state inserters 260 are connected. Moreover, the state counter 250' further comprises eight registers for insertion limits for each of the four signal lines of the command bus and for both, a signal level corresponding to a 0 and a signal level corresponding to a 1.

The reason for employing a different, more complicated state counter 250' compared to the state counter 250 for the address line A0, as shown in FIG. 3, is due to the command encoding of the DDR2 bus as shown in FIG. 2. These signals need to be treated as a group. Therefore, the insertion recommendation is done in the command state counter 250' for all four signals simultaneously, which is further described and illustrated in FIGS. 8 to 10. As mentioned above, the state inserters 260 themselves are the same as the one depicted in FIG. 3 and illustrated in FIG. 6.

Figure 8:
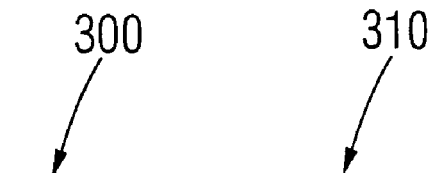
FIG. 8 shows a first part of a behavioral description of a command state counter block of the embodiment shown in FIG. 3.

FIG. 8 shows a first part of a behavioral description of the command state counter block 250' of the embodiment shown in FIGS. 3 and 7. For each of the four signal lines of the command bus, there is one difference or delta counter, which is incremented by 1, if a 1 is transmitted over the corresponding or respective signal line 100, and which is decremented by 1, if 0 is transmitted over the corresponding signal line. Accordingly, the four counters are called "ctr_1m0_cs" for the CS signal line, "ctr_1m0_ras" for the RAS signal line, "ctr_1m0_cas" for the CAS signal line and "ctr_1m0_we" for the WE signal line. Once again, as in the context of the counter introduced in the context of the state counter 250 described in FIG. 5 with respect to its behavior, the label "1m0" indicates the incrementing and decrementing according to the transmitted signals, as explained above.

The four delta counters, one for each CS#, RAS#, CAS# and WE# signal, are incremented or decremented with every rising clock edge (cf. line 49), depending on the content of the respective transmitted signals.

FIG. 9 shows a second part of the behavioral description of a command state counter block 250' or the CMD state counter block 250' of the embodiment of the apparatus as shown in FIGS. 3 and 7. The instructions shown in FIG. 9, result in a calculation of an absolute deviation for every difference counter of the four signal lines from the corresponding limits (limit_ins_cs_0, limit_ins_cs_1, limit_ins_ras_0, limit_ins_ras_1, limit_ins_cas_0, limit_ins_cas_1, limit_ins_we_0 and limit_ins_we_1), after the four counters are updated. However, if a counter is within the specified limits, the absolute deviation is set to 0. The absolute deviations are stored in the four respective variables or abs_dev_cs, abs_dev_ras, abs_dev_cas, and abs_dev_we.

To be more precise, lines 68 to 78 comprise the calculation of the absolute deviation for the chip select signal (CS#). Accordingly, lines 80 to 90 correspond to the RAS# signal line, lines 92 to 102 to the CAS# signal lines, and lines 104 to 114 to the WE# signal line. In lines 116 to 117, furthermore, a user-defined delay function CMDCTRDLYHALF is used.

FIG. 10 shows a third part of a behavioral description of the command state counter block 250' of the embodiment of the apparatus 100 shown in FIGS. 3 and 7. The previously calculated absolute deviations are checked, if an insertion is necessary at all. This is initiated in lines 119 to 121, if not, the corresponding output signals are set to 0 in lines 169 to 171.

However, if an insertion is necessary, it is important in the context of the command bus, as discussed in the framework of FIG. 2, to find out which signal of the four signals has the largest deviation, and hence, gets priority from an upcoming insertion. In the case that the chip select signal (CS#) has the largest deviation and needs a 1 to be inserted, a NOP command or a No Operation 230 command needs to be inserted on the command bus. Lines 122 to 132 show the corresponding instructions.

If not, a DES command or the Device Deselect 240 command needs to be inserted on the command bus, which is done in lines 133 to 135. While in the case of a NOP, CS# must be driven low (=L or 0), while RAS#, CAS#, and WE# need to be driven high (=H or 1). In the case of a DES command, the CS# signal line must be driven high (=H or 1). Based on the command encoding shown in FIG. 2, the remaining signals RAS#, CAS#, and WE# may in this case be either high or low. Therefore, for every single of these three, it is checked to see if a 0 or a 1 should be inserted, depending on the delta of difference counter for transmitted 0s and 1s. This is done for the RAS# signal line in lines 137 to 145, for the CAS# signal in lines 147 to 155 and for the WE# signal line in lines 157 to 165. The corresponding output signals are then set according to this algorithm.

However, again, the final decision if an insertion is done at all or not, is done within the four insertion blocks for CS#, RAS#, CAS# and WE#, shown in the block diagram in FIG. 7, and described in the context of FIG. 6.

Figure 11:
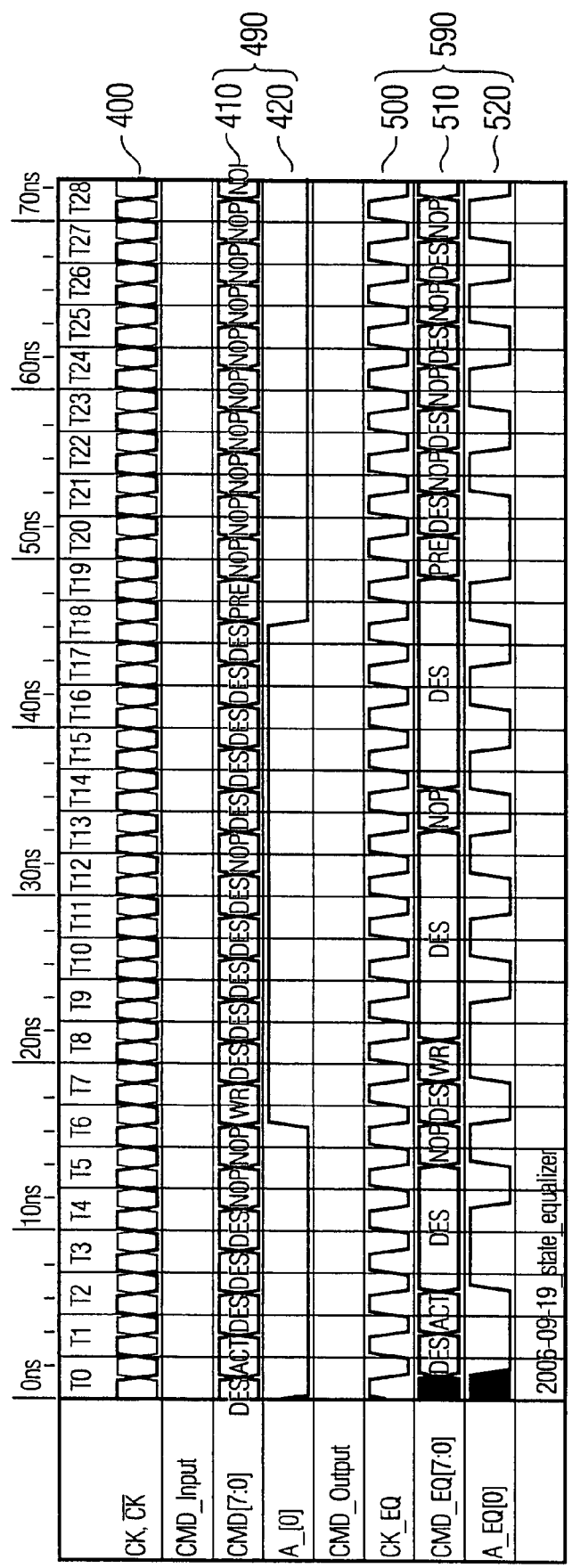
FIG. 11 shows a diagram for a signal A[0] along with timing diagrams for other signals in the case of the embodiment shown in FIG. 3.
Figure 12:
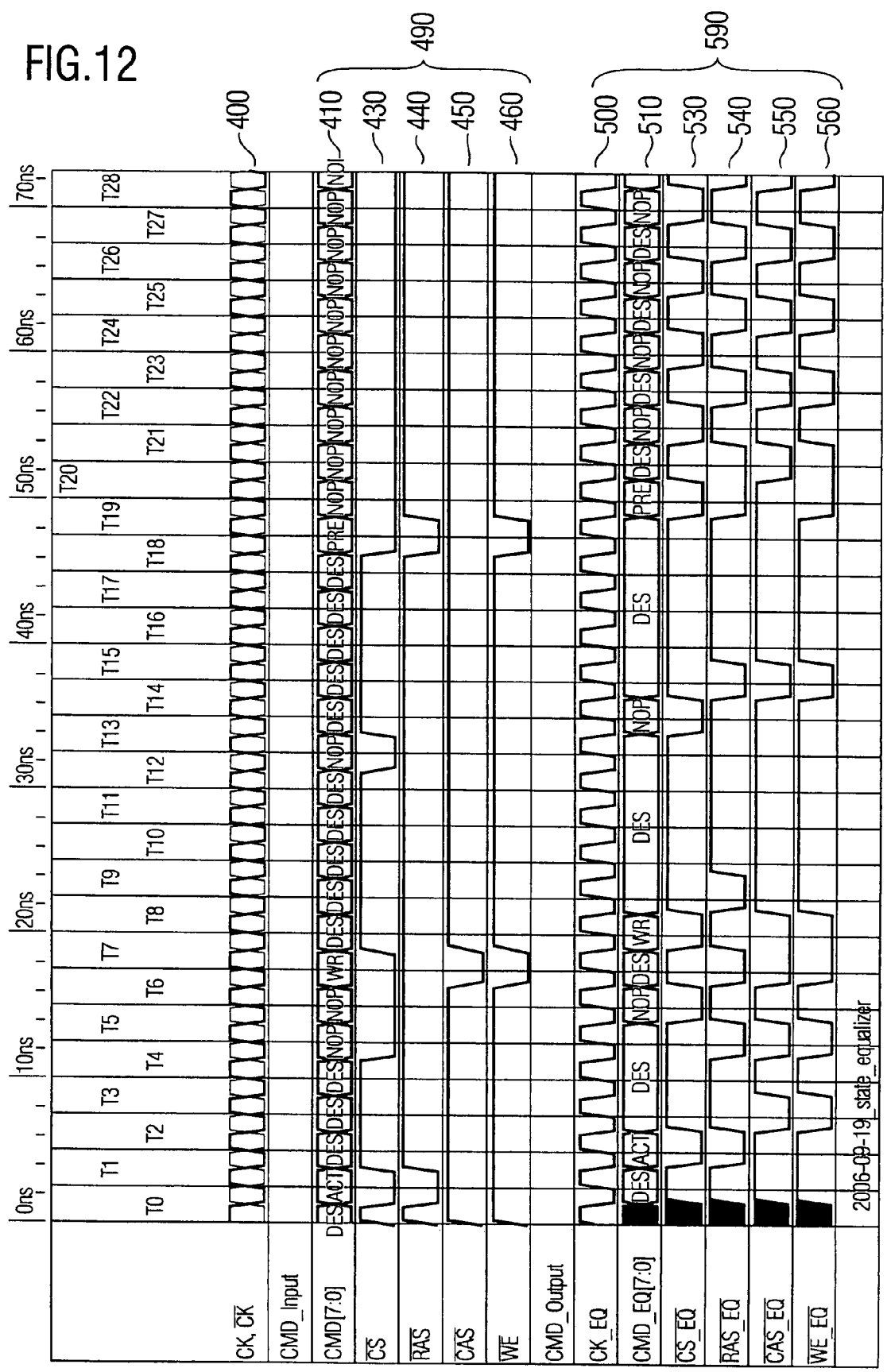
FIG. 12 shows a timing diagram for a command signal in the case of the embodiment shown in FIG. 3.

FIGS. 11 and 12 show an example of two timing diagrams within the framework of the embodiment of the present invention, as shown in FIGS. 3 and 7. To be more precise, FIG. 11 show an example of a timing diagram for the signal A[0] with and without applying an embodiment of the apparatus 100. FIG. 12 shows an example of a timing diagram for command signals with and without applying an embodiment of the apparatus 100, as shown in FIGS. 3 and 7. However, in both FIGS. 11 and 12, all insertion limits are set to 1. This results, as will be discussed, in a lot of desired switching of the corresponding signals, if allowed by the transmitted commands on the command bus.

However, in the case of the AC power, which comes with all the switching becoming too large, the amount of switching can simply be reduced by a certain degree, by either applying larger insertion limits and/or by dynamically adjusting the insertion limits during operation. With this, it is possible to achieve a hysteresis or a hysteretic behavior.

Furthermore, additionally or alternatively, it is possible to apply the decision to insert the 0 or the 1 for more than one clock cycle. Hence, it is possible to apply the decision of a 0-x insertion or a 1-x insertion, for a fixed, adaptable, or programmable number of clock cycles, wherein the number of clock cycles cannot only be chosen individually for each clock signal, but can also be changed during the operation or on-the-fly. The decision on how all the parameters mentioned can be adapted over the course of time, can for instance, be based on the course of the counters over time in some embodiments. By adapting the appropriate parameters, it is possible to approach the target ratio of 0s and 1s quickly.

Turning back to FIG. 11, this figure shows an example of a timing diagram for the signal line A[0], with an insertion limit set to 1. Furthermore, in the behavioral descriptions, the sum of all delays introduced by user-defined delay functions are set to 1 cycle. Both parameters are not a requirement, but serve only the purpose of explaining the effect of an embodiment of the apparatus 100 more easily and more comprehensively. However, in a concrete implementation, the delay can differ substantially, ranging from less than one cycle to substantially more than 1 cycle, although due to the feedback described in the context of FIGS. 3 and 7, a delay of less than one cycle is less probable. Furthermore, as can be seen from the time scale shown in both FIGS. 11 and 12, the examples given in both figures are based on a 400 MHz bus structure.

FIG. 11 shows a comparison of the clock signal CK (signal 400, along with the inverse clock signal) a sequence of commands 410 provided over the command bus CMD[7:0], along with a signal 420 over the signal line A[0]. Both, the command sequence 410 and the signal 420 setup the input signals 490 of the embodiment. FIG. 11 furthermore shows the output of the equalized clock signal CK_EQ denoted by numeral 500 in FIG. 11, as well as, the equalized sequence of commands 510 on the command bus CMD_EQ[7:0], and the output or the equalized output of the address line A_EQ[0] denoted by the numeral 520. The three signals mentioned form the output signals 590.

The timing diagram shown in FIG. 11 is derived from a simulation, based on the implementation as described above. The focus of this diagram is, as explained, set to the address signal A0, A[0] at the input and A_EQ[0] at the output of the embodiment of the apparatus 100. It can clearly be seen that the output signal A_EQ[0] is set to the same value as the input signal A[0] in case of an "A0-active" command such as an ACT or a WR command. However, when comparing the output signal to the input signal, the delay of 1 cycle has to be taken into account. Whereas the input command lines, show for instance, an ACT command at the time T1 with a signal level of A[0] being low, the output signal provides the same command with the same signal level at the A0_EQ(0) signal line one cycle later, at the time T2. Another example is the WR command with a high level of the A0 signal level line at the time T7, to which the output of the time T8 corresponds. However, during other "A0-inactive" commands, a A_EQ[0] is free for state insertions, which results in a significantly higher amount of toggling, as the signal 520 shows, which results in a significantly better equilibrium of 0s and 1s, as the target ratios for this example is 1 (=50%:50%).

FIG. 12 shows a further timing diagram of a simulation based on the implementation described above. To be more precise, FIG. 12 shows once again the clock signal CK (signal 400 along with the inverse of the clock signal), along with a set of input signals 490 and a set of output signals 590. The set of input signals 490 comprises a sequence of input commands 410, a CS# or chip select signal 430, a RAS# input signal 440, a CAS# input signal 450 and a WE# input signal 460. The set of output signals 590 comprises, apart from the equalized clock signals 500, an equalized version of the sequence of amounts 510 as well as equalized versions of the CS# signal 530, the RAS# signal 540, the CAS# signal 550 and the WE# signal 560.

The focus of this diagram is set to the command bus (CMD [7:0] at the input) and the equalized command bus output (CMS_EQ[7:0] at the output). The active commands ACT, WR and PRE at the times T1, T7 and T19 provided at the input of the circuitry of an embodiment of the apparatus 100 is in the sequence of command signal 410 (CMD[7:0]) are fed through and driven out to the bus without any changes 1 clock cycle later at the times T2, T8 and T20, due to the described delay (cf. signal CMD_EQ[7:0], signal 510). The individual signals encoding these commands are CS# (430), RAS# (440), CAS# (450) and WE# (460) at the input and CS_EQ# (530), RAS_EQ# (540), CAS_EQ# (550) and WE_EQ# (560) at the output. Considering the output signals 530, 540, 550 and 560, it can easily be seen that the output signals show much more toggling than the input signals, which results in a better equilibrium of transmitted 0s and 1s on the command bus.

However, as explained before, it might be advisable to use different parameters for the insertion limits and the other mentioned parameters, to reduce the amount of toggling compared to the examples shown in FIGS. 11 and 12, to reduce the AC power dissipation, compared to the dissipated DC power of the input signal. In other words, it might be advisable to reduce the amount of toggling in order to reduce the AC power consumption, which scales approximately with the number of signal edges over time.

In some embodiments of the present invention the threshold values, are adapted, adaptable, programmed or programmable such that the ratio of the first time during which the signal line is at the first value and the second time during which the signal line is at the second value shows a hysteretic behavior. Furthermore, in some embodiments of the present invention, the length of time the window is adapted, adaptable, programmed or programmable such that a typical frequency of switching is changeable.

Furthermore, embodiments of the present invention are not limited to the field of DDR2 memory systems. Moreover, embodiments of the present invention can always be implemented to any signal line having a necessity to reduce an overall occurrence of one signal level. As discussed above, one reason can be the presence of an RC termination or another capacitor or capacitance present on the signal line. Furthermore, the advantages of the embodiments of the present invention come especially into play, when the signal line offers enough time to allow a toggling of the signal levels or a switching between different signal levels. However, different scenarios are possible, in which embodiments of the present invention can also advantageously be implemented.

Depending on certain implementation requirements of the embodiments of the inventive methods, embodiments of the inventive methods can be implemented in hardware or in software. The implementation can be performed using a digital storage medium, in particular, a disc, a CD or a DVD, having an electronically readable control signal stored thereon, which cooperates with a programmable computer system, such that an embodiment of the inventive methods is performed. Generally, an embodiment of the present invention is, therefore, a computer program product with a program code stored on a machine-readable carrier, the program code being operative for performing an embodiment of the inventive methods, when the computer program runs on the computer, a processor, or another integrated circuit. In other words, embodiments of the inventive methods are therefore, a computer program having a program code for performing at least one of the inventive methods, when the computer program runs on a computer, processor, or another integrated circuit.

While the foregoing has been particularly described with reference to particular embodiments thereof, it will be understood by those skilled in the art that various other changes in the forms and details may be made without departing from the broader spirit and scope thereof. It is to be understood that various changes may be made in adapting to different embodiments without departing from the broad concept disclosed herein, and comprehended by the claims that follow.

What is claimed is:

1. An apparatus for providing a signal for transmission via a signal line, the apparatus comprising:
   a controller circuit comprising an output for a signal indicating whether the signal line is or will be in an inactive state; and a switching circuit coupled to the controller circuit and having an output coupled to the signal line, wherein the output is switched between different signal levels, if the signal indicates that the signal line is or will be in an inactive state, wherein the switching between the different signal levels is such that a first time during which the signal line is at a first signal level is adapted to a ratio of the first time and a second time during which the signal line is at a second signal level.

2. The apparatus according to claim 1, further comprising a counter determining the first time and the second time.

3. The apparatus according to claim 1, wherein a signal level that the signal line is switched to by the switching circuit is determined based on a difference of the first time and the second time.

4. The apparatus according to claim 3, wherein a signal level of the signal line is only switched, if the difference of the first time and the second time exceeds a fixed, adaptable or programmable threshold value.

5. The apparatus according to claim 1, wherein the first time and the second time are determined based on the signal levels of the signal line during a time window with a fixed, adaptable or programmable length.

6. The apparatus according to claim 1, wherein the signal indicates whether the signal line is or will be in an inactive state based on signal line states of at least one other signal line.

7. The apparatus according to claim 1, wherein the signal line is a line of a data bus or a command/address bus of a memory system.

8. The apparatus according to claim 7, wherein the signal indicates an inactive state if a Single Bank Precharge state, a Precharge all Banks state, a No Operation state or a Device Deselect state is recognized based on signal states of at least one of command lines and address lines of the command/address bus.

9. The apparatus according to claim 1, further comprising a plurality of additional signal lines, a counter determining a time during which each signal line of the plurality of additional signal lines is on a respective signal level and a selector determining a signal line of the plurality of additional signal lines the signal level of which is to be switched based on the time during which each signal line of the plurality of additional signal lines is on a respective signal level.

10. An apparatus for providing a signal for transmission via a signal line, the apparatus comprising:
    a controller circuit comprising an output for a signal indicating whether the signal line is or will be in an inactive state;
    a switching circuit coupled to the controller circuit and having an output coupled to the signal line, wherein the output is switched between different signal levels, if the signal indicates that the signal line is or will be in an inactive state;
    a plurality of additional signal lines;
    a counter determining a time during which each signal line of the plurality of additional signal lines is on a respective signal level; and
    a selector determining a signal line of the plurality of additional signal lines the signal level of which is to be switched based on the time during which each signal line of the plurality of additional signal lines is on a respective signal level, wherein the selector determines the signal line of the plurality of additional signal lines based on a maximum difference of a respective first time during which each signal line of the plurality of additional signal lines is at a first signal level compared to a respective second time during which each of the additional signal lines is at a second signal level.

11. An apparatus for providing a signal for transmission via a signal line of a data bus or a command/address bus of a memory system, the apparatus comprising:
    a controller circuit for determining whether the signal line is or will be an inactive state by recognizing a Single Bank Precharge state, a Precharge all Banks state, a No Operation state or a Device Deselect state based on signal states of at least one of command lines and address lines of the command/address bus; and
    a switching circuit for switching a signal on the signal line between different signal levels, if the controller circuit for determining an inactive state determines that the signal line is or will be in an inactive state, wherein the switching between the different signal levels is such that a first time during which the signal line is at a first signal level is adapted to a ratio of the first time and a second time during which the signal line is at a second level.

12. The apparatus according to claim 11, further comprising a counter for determining the first time and the second time.

13. The apparatus according to claim 11, further comprising a plurality of additional signal lines of at least one of the data bus and the command/address bus, a counter determining a time during which each signal line of the plurality of additional signal lines is on a respective signal level and a selector determining a signal line of the plurality of additional signal lines the signal level of which is to be switched based on the time during which each signal line of the plurality of additional signal lines is on a respective signal level.

14. An apparatus for providing a signal for transmission via a signal line of a data bus or a command/address bus of a memory system, the apparatus comprising:
    a controller circuit for determining whether the signal line is or will be an inactive state by recognizing a Single Bank Precharge state, a Precharge all Banks state, a No Operation state or a Device Deselect state based on signal states of at least one of command lines and address lines of the command/address bus;
    a switching circuit for switching a signal on the signal line between different signal levels, if the controller circuit for determining an inactive state determines that the signal line is or will be in an inactive state;
    a plurality of additional signal lines of at least one of the data bus and the command/address bus,
    a counter determining a time during which each signal line of the plurality of additional signal lines is on a respective signal level; and
    a selector determining a signal line of the plurality of additional signal lines the signal level of which is to be switched based on the time during which each signal line of the plurality of additional signal lines is on a respective signal level, wherein the selector determines the signal line of the plurality of additional signal lines based on a maximum difference of a respective first time during which each signal line of the plurality of additional signal lines is at a first signal level compared to a respective second time during which each of the additional signal lines is at a second signal level.

15. An apparatus for providing a signal for transmission via a signal line, the apparatus comprising:
    means for determining whether the signal line is or will be in an inactive state; and
    means for switching the signal on the signal line between different signal levels, if the means for determining determines that the signal line is or will be in an inactive state, wherein the switching between the different signal levels is such that a first time during which the signal line is at a first signal level is adapted to a ratio of the first time and a second time during which the signal line is at a second signal level.

16. The apparatus according to claim 15, further comprising means for determining the first time and the second time.

17. The apparatus according to claim 15, wherein a signal level which the signal line is switched to by the means for switching is determined based on a difference of the first time and the second time.

18. The apparatus according to claim 17, wherein the signal level of the signal line is only switched, if the difference of the first time and the second time exceeds a fixed, adaptable or programmable threshold value.

19. The apparatus according to claim 15, wherein the first time and the second time are determined based on the signal levels of the signal line during a time window, with a fixed, adaptable or programmable length.

20. The apparatus according to claim 15, further comprising:
a plurality of additional signal lines;
means for determining a time during which each signal line of the plurality of additional signal lines is on a respective signal level; and
means for selecting a signal line of the plurality of additional signal lines, the signal level of which is to be switched based on the time during which each additional signal line is on a respective signal level.

21. An apparatus for providing a signal for transmission via a signal line, the apparatus comprising:
means for determining whether the signal line is or will be in an inactive state;
means for switching the signal on the signal line between different signal levels, if the means for determining determines that the signal line is or will be in an inactive state;
a plurality of additional signal lines;
means for determining a time during which each signal line of the plurality of additional signal lines is on a respective signal level; and
means for selecting a signal line of the plurality of additional signal lines, the signal level of which is to be switched based on the time during which each additional signal line is on a respective signal level, wherein the means for selecting determines the signal line of the plurality of additional signal liens based on a maximum difference of a respective first time during which each additional signal line is at a first signal level compared to a respective second time during which each of the additional signal lines is at a second signal level.

22. A method for providing a signal for transmission via a signal line, the method comprising:
determining whether the signal line is or will be in an inactive state; and
switching the signal on the signal line between different signal levels, if the signal line is in an inactive state, wherein switching between the different signal levels is such that a first time during which the signal line is at a first signal level is adapted to a second time during which the signal line is at a second signal level, wherein a signal level which the signal line is switched to is determined based on a difference of the first time and the second time.

23. A method for providing a signal for transmission via a signal line, the method comprising:
determining whether the signal line is or will be in an inactive state; and
switching the signal on the signal line between different signal levels, if the signal line is in an inactive state, wherein switching between the different signal levels is such that a first time during which the signal line is at a first signal level is adapted to a second time during which the signal line is at a second signal level, wherein the first time and the second time are determined based on the signal levels of the signal line during a time window with a fixed, adaptable or programmable length.

24. A method for providing a signal for transmission via a signal line, the method comprising:
determining whether the signal line is or will be in an inactive state; and
switching the signal on the signal line between different signal levels, if the signal line is in an inactive state, wherein switching between the different signal levels is such that a first time during which the signal line is at a first signal level is adapted to a second time during which the signal line is at a second signal level, wherein a signal level of the signal line is only switched, if a difference of the first time and the second time exceeds a fixed, adaptable or programmable threshold value.

25. A method for providing a signal for transmission via a signal line, the method comprising:
determining whether the signal line is or will be in an inactive state;
switching the signal on the signal line between different signal levels, if the signal line is in an inactive state;
determining a time during which each signal line of a plurality of additional signal lines is on a respective signal level; and
selecting a signal line of the plurality of additional signal lines the signal level of which is to be switched based on the time during which each signal line of the plurality of additional signal lines is on a respective signal level, wherein selecting comprises determining the signal line of the plurality of additional signal lines based on a maximum difference of a respective first time during which each additional signal line is at a first signal level compared to a respective second time during which each of the additional signal lines is at a second signal level.

26. A method for providing a signal for transmission via a signal line of a data bus or a command/address bus of a memory system, the method comprising:
determining whether the signal line is or will be in an inactive state by recognizing a Single Bank Precharge state, a Precharge all Banks state, a No Operation state or a Device Deselect state based on the signal states of at least one of the command lines and of the address lines of the command/address bus; and
switching a signal on the signal line between different signal levels, if the signal line is in an inactive state, wherein the switching between the different signal levels is such that a first time during which the signal line is at a first signal level is adapted to a ratio of the first time and a second time during which the signal line is at a second signal level.

27. The method according to claim 26, further comprising:
determining a time during which each signal line of a plurality of additional signal lines is on a respective signal level; and
selecting a signal line of the plurality of additional signal lines the signal level of which is to be switched based on the time during which each additional signal line is on a respective signal level.

28. A method for providing a signal for transmission via a signal line of a data bus or a command/address bus of a memory system, the method comprising:
- determining whether the signal line is or will be in an inactive state by recognizing a Single Bank Precharge state, a Precharge all Banks state, a No Operation state or a Device Deselect state based on the signal states of at least one of the command lines and of the address lines of the command/address bus;
- switching a signal on the signal line between different signal levels, if the signal line is in an inactive state;
- determining a time during which each signal line of a plurality of additional signal lines is on a respective signal level; and
- selecting a signal line of the plurality of additional signal lines the signal level of which is to be switched based on the time during which each signal line of the plurality of additional signal lines is on a respective signal level, selecting comprises determining the signal line of the plurality of additional signal lines based on a maximum difference of a respective first time during which each additional signal line is at a first signal level compared to a respective second time during which each of the additional signal lines is at a second signal level.

* * * * *